United States Patent
Hamakubo et al.

(10) Patent No.: US 8,178,480 B2
(45) Date of Patent: May 15, 2012

(54) LUBRICANT FOR MAGNETIC DISK, PROCESS FOR PRODUCING THE SAME, AND MAGNETIC DISK

(75) Inventors: Katsushi Hamakubo, Tokyo (JP); Koichi Shimokawa, Tokyo (JP); Kota Suzuki, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 100 days.

(21) Appl. No.: 12/443,435

(22) PCT Filed: Sep. 28, 2007

(86) PCT No.: PCT/JP2007/069088
§ 371 (c)(1),
(2), (4) Date: May 28, 2009

(87) PCT Pub. No.: WO2008/038799
PCT Pub. Date: Apr. 3, 2008

(65) Prior Publication Data
US 2010/0028721 A1    Feb. 4, 2010

(30) Foreign Application Priority Data

Sep. 29, 2006 (JP) .................. 2006-267794
Sep. 29, 2006 (JP) .................. 2006-267795
Mar. 31, 2007 (JP) .................. 2007-095855

(51) Int. Cl.
*C10M 169/04* (2006.01)
*C10M 169/00* (2006.01)
*C07C 43/10* (2006.01)
*G11B 5/706* (2006.01)

(52) U.S. Cl. ......... 508/582; 508/182; 568/677; 428/848
(58) Field of Classification Search .................. 508/182, 508/582; 428/848; 568/677
See application file for complete search history.

(56) References Cited

U.S. PATENT DOCUMENTS

| | | | | |
|---|---|---|---|---|
| 4,830,910 A | * | 5/1989 | Larson | 428/336 |
| 5,663,127 A | * | 9/1997 | Flynn et al. | 508/250 |
| 6,099,981 A | | 8/2000 | Nishimori | |
| 6,316,062 B1 | * | 11/2001 | Sakaguchi et al. | 427/570 |

FOREIGN PATENT DOCUMENTS

| | | |
|---|---|---|
| JP | 62-66417 A | 3/1987 |
| JP | 7-141645 A | 6/1995 |
| JP | 2006-70173 A | 3/2003 |
| JP | 2003-162810 A | 6/2003 |
| JP | 2004-95094 A | 3/2004 |
| JP | 2004-95163 A | 3/2004 |
| JP | 2006-59491 A | 3/2006 |

\* cited by examiner

*Primary Examiner* — Walter D Griffin
*Assistant Examiner* — Vishal Vasisth

(57) ABSTRACT

A lubricant for magnetic disks which can form a lubricating layer having a reduced thickness while attaining a high coverage and is excellent in heat resistance and adhesion to a protective layer. The lubricant for magnetic disks comprises a perfluoropolyether compound in which the relationship between the number-average molecular weight and the standardized value of the number of hydroxy groups contained in the molecule satisfies the following: the number-average molecular weight is in the range of 1,000-6,000; the standardized value of the number of hydroxy groups contained in the molecule is 180 or higher; and the compound is in a region located below the line connecting the point where the number-average molecular weight is 1,000 and the standardized value of the number of hydroxy groups in the molecule is 400 to the point where the number-average molecular weight is 6,000 and the standardized value of the number of hydroxy groups in the molecule is 1,600. The compound has at least one hydroxy group around the center of the molecular chain.

8 Claims, 1 Drawing Sheet

10 MAGNETIC DISK

5 LUBRICATING LAYER
4 CARBON-BASED PROTECTIVE LAYER
3 MAGNETIC LAYER
2b UNDERLAYER ⎫
                ⎬ 2 NONMAGNETIC METAL LAYER
2a ADHESIVE LAYER ⎭
1 SUBSTRATE

LUBRICANT FOR MAGNETIC DISK, PROCESS FOR PRODUCING THE SAME, AND MAGNETIC DISK

This application is a 371 of PCT/JP2007/069088, filed Sep. 28, 2007.

TECHNICAL FIELD

This invention relates to a lubricant for use in a magnetic disk adapted to be mounted in a magnetic disk apparatus, such as a hard disk drive, a process for producing it, and a magnetic disk.

BACKGROUND ART

Conventionally, in each of magnetic disks adapted to be mounted in magnetic disk apparatuses, such as hard disk drives (hereinafter abbreviated as HDDs), a protective layer and a lubricating layer are provided on a magnetic recording layer formed over a substrate, for a purpose of ensuring durability and reliability of the magnetic disk. Particularly, the lubricating layer used as the outermost surface is required to have various properties such as long-term stability, chemical substance resistance, friction properties, and heat resistance.

To satisfy such a requirement, perfluoropolyether-based lubricants having hydroxyl groups in molecules have often been used conventionally as lubricants for magnetic disks. For example, JP-A-S62-66417 (Patent Document 1) or the like discloses a known magnetic recording medium or the like coated with a perfluoroalkylpolyether lubricant having a structure of $HOCH_2CF_2O(C_2F_4O)_p(CF_2O)_qCH_2OH$. In this lubricant it is known that when hydroxyl groups are present in molecules of a lubricant, adhesion properties of the lubricant to a protective layer can be obtained by the interaction between the protective layer and the hydroxyl groups. As commercial products of perfluoropolyether-based lubricants, use is often made of Fomblin Z-based lubricants of Solvay Solexis, Inc. having heat resistance and stability. For the purpose of removing impurities or the like from these commercial lubricants or for the purpose of obtaining a proper molecular weight distribution because of each of these lubricants being a polymer substance, various purifications have been carried out and purified products have been used as lubricants for magnetic disks.

Further, JP-A-2006-70173 (Patent Document 2) discloses a lubricant containing polyether fluoride having a structural unit with hydroxy groups and $CF_2$ at both ends, having a number-average molecular weight of 4000 to 12000, and having in average 1 to 10 hydroxy groups on the midway of the molecular chain per molecule.

Patent Document 1: JP-A-S62-66417
Patent Document 2: JP-A-2006-70173

DISCLOSURE OF THE INVENTION

Problem to be Solved by the Invention

In recent years, the storage capacities of magnetic disk apparatuses such as HDDs have been increasing rapidly. And recently, LUL (Load Unload)-system magnetic disk apparatuses are being introduced in place of conventional CSS (Contact Start and Stop)-system ones. In the LUL system, a magnetic head is retreated to an inclined platform called a ramp located outside a magnetic disk while the apparatus is stopped, then at the time of start-up, the magnetic head is caused to slide from the ramp, after the magnetic disk starts to rotate, so as to fly over the magnetic disk to perform recording/reproduction. This sequence of operations is called an LUL operation. As compared with the CSS system, the LUL system can ensure a wider recording/reproducing region on the surface of the magnetic disk and thus is preferable for increasing the information capacity. Further, since it is not necessary to provide the convex-concave shape for CSS on the surface of the magnetic disk, it is possible to significantly smooth the surface of the magnetic disk. Consequently, the flying height of the magnetic head can be further reduced and therefore it is possible to increase the S/N ratio of a recording signal, which is thus preferable.

Because of the further reduction in magnetic head flying height following the introduction of the LUL system, it has become necessary that a magnetic disk stably operate even in the case of a low flying height of 10 nm or less. However, when a magnetic head is flown over the surface of a conventional magnetic disk with such a low flying height, there has arisen a problem that fly stiction failure, head corrosion failure, or the like frequently occurs.

The fly stiction failure is a failure in which the flying posture or the flying height of a magnetic head goes out of order while it is flying, followed by irregular reproduction output changes. Depending on circumstances, a magnetic disk and a magnetic head may be brought into contact with each other during flying to cause a head crash failure.

The corrosion failure is a failure in which an element portion of a magnetic head is subjected to corrosion to cause a trouble in recording/reproduction. Depending on circumstances, recording/reproduction may be disabled or a corroded element may expand to cause damage to the surface of a magnetic disk while flying.

The present inventors have got knowledge that the occurrence of the above failures becoming noticeable in recent magnetic disks may be resulted from the occurrence of the following mechanism.

When the flying height of a magnetic head becomes a low flying height of, for example, 10 nm or less, the magnetic head repeatedly exerts adiabatic compression and adiabatic expansion on a lubricating layer on the surface of a magnetic disk through air molecules while flying, so that the lubricating layer tends to be repeatedly subjected to heating and cooling and therefore a reduction in molecular weight of a lubricant forming the lubricating layer tends to be promoted. If the molecular weight of the lubricant is reduced, its fluidity increases so that its adhesion to a protective layer decreases. Then, it is considered that the lubricant with the increased fluidity is transferred and deposited on the magnetic head located in an extremely close positional relationship to make its flying posture unstable, thus causing the fly stiction failure. Particularly, a recently introduced magnetic head with an NPAB (negative pressure) slider is considered to facilitate the transfer deposition phenomenon because it tends to suck the lubricant due to a strong vacuum created at the bottom surface of the magnetic head. The transferred and deposited lubricant may produce an acid such as hydrofluoric acid to thereby corrode an element portion of the magnetic head. Particularly, a magnetic head mounted with a magnetoresistive effect element tends to be corroded.

Further, the present inventors have got knowledge that the LUL system facilitates the occurrence of these failures. It has been found that, in the case of the LUL system, as opposed to the case of the CSS system, a magnetic head does not contact-slide on the surface of a magnetic disk and thus it is difficult for a lubricant once transferred and deposited on the magnetic head to be removed by transfer to the magnetic disk side. It is considered that, in the case of the conventional CSS system, a lubricant transferred onto a magnetic head tends to be cleaned off by its contact sliding on a CSS region of a magnetic disk and, therefore, these failures are not actualized.

Recently, in order to increase the response speed of a magnetic disk apparatus, the rotation speed of a magnetic disk is increased. The rotation speed of a small-diameter 2.5-inch magnetic disk apparatus, for example, suitable for mobile applications was conventionally about 4200 rpm, while, recently, the response characteristics are enhanced by rotating it at a high speed of 5400 rpm or more. When the magnetic disk is rotated at such a high speed, a phenomenon is actualized in which a lubricating layer moves (migrates) due to a centrifugal force caused by the rotation so that the thickness of the lubricating layer becomes nonuniform in the plane of the magnetic disk. Further, recently, magnetic disk apparatuses have started to be used not only as storage devices of conventional personal computers, but also as those of, for example, portable information terminals, car navigation systems, and so on and, therefore, due to diversification of use applications and so on, the environmental resistance required for magnetic disks has become very strict.

Therefore, in view of these circumstances, it is urgently necessary, more than conventional, to further improve the heat resistance of a lubricant forming a lubricating layer, the adhesion thereof to a protective layer, and so on.

In the meantime, following rapid improvement in information recording density of magnetic disks in recent years, it is required to reduce the magnetic spacing between a magnetic head and a recording layer of a magnetic disk and, therefore, it has become necessary to further reduce the thickness of a lubricating layer present between the magnetic head and the recording layer of the magnetic disk.

A lubricant used as a lubricating layer at the outermost surface of a magnetic disk largely affects the durability of the magnetic disk. As described above, currently, the commercial perfluoropolyether-based lubricants are often used as lubricants for magnetic disks. These commercial perfluoropolyether-based lubricants each contain a polymer component and each have a molecular weight distribution caused by a synthesizing process thereof and, even if using various purification processes, it is almost impossible to control to the completely single molecular weight. Therefore, there is a problem that even after the purification, there is a certain molecular weight distribution and it is difficult to control the molecular weight. A method of forming a lubricating layer using such a lubricant comprises immersing a magnetic disk into a solution in which the lubricant is dissolved (dipping method), then, after drawing it up, carrying out a heat treatment, a UV treatment, and so on for imparting it with adhesion to a protective layer. The thickness of the lubricating layer to be formed in this manner is controlled by dissolving the lubricant in a solvent and roughly adjusting the concentration thereof, but, actually, also in terms of balance with the molecular weight described above, it is difficult to strictly control the thickness of the lubricating layer to be formed only by the concentration of the lubricant solution.

Of course, if the concentration of the lubricant solution is reduced, the thickness of the lubricating layer can be by and large reduced. However, with a lubricating layer formed using such a low-concentration lubricant solution, it is difficult to completely cover the surface of a protective layer. That is, there is a problem that if an attempt is made to realize a reduction in thickness of a lubricating layer to be formed by adjusting the concentration of the lubricant solution, the coverage of the surface of a magnetic disk decreases, resulting in poor durability of the magnetic disk. Alternatively, it is considered to achieve a reduction in thickness of a lubricating layer by reducing the molecular weight of the lubricant, but, there is a problem that it is very difficult to control the molecular weight of the lubricant as described above and, if the molecular weight of the lubricant is small, the heat resistance degrades and further the corrosion failure tends to occur due to transfer thereof onto a magnetic head, resulting in poor durability, which thus can by no means be adopted.

As described above, in the case of the lubricating layer using the conventional magnetic-disk lubricant, it is difficult to form a high-coverage uniform lubricating layer with a further reduced thickness on the surface of a magnetic disk, which has been an impeding factor in realizing a magnetic disk excellent in long-term stability of a formed lubricating layer and having high reliability even with the reduction in magnetic spacing following the increase in recording density in recent years and with the low flying height of a magnetic head. Further, as described above, since the environmental resistance required for magnetic disks has become very strict due to diversification of use applications and so on, it is required, more than conventional, to further improve the properties such as heat resistance of a lubricant forming a lubricating layer and adhesion thereof to a protective layer.

According to the lubricant disclosed in the above Patent Document 2, it is described that even if the molecular weight is increased, the film thickness can be made thin and excellent CSS durability can be obtained. However, there is a problem that when the molecular weight is increased, the flow properties (flow properties particularly at low temperatures) decrease and thus the self-repair properties degrade, so that high reliability cannot be obtained when used in a very severe environment as described above.

This invention has been made in view of these conventional circumstances and has an object, firstly, to provide a lubricant for a magnetic disk that can reduce the thickness of a lubricating layer while achieving high coverage and is excellent in heat resistance and adhesion to a protective layer, secondly, to provide a magnetic-disk lubricant production process that can suitably produce the above magnetic-disk lubricant, and thirdly, to provide a magnetic disk that comprises a high-coverage uniform lubricating layer capable of, even with a reduced thickness, sufficiently covering the surface of a protective layer and excellent in heat resistance and adhesion to the protective layer, that can achieve a further reduction in thickness of a lubricating layer required for reducing the magnetic spacing, and that has high reliability even with the low flying height of a magnetic head following the increase in recording density in recent years and with very strict environmental resistance following the diversification of applications.

Means for Solving the Problem

The present inventors have diligently studied a new magnetic-disk lubricant and found that the above problems can be solved by the following inventions, and have completed this invention.

Specifically, this invention has the following configurations.

(Configuration 1)

A lubricant for a magnetic disk, the lubricant containing a perfluoropolyether-based compound in which, in a relationship between a number-average molecular weight and a normalized value of the number of hydroxyl groups contained in a molecule, the number-average molecular weight is in the range of 1000 to 6000, the normalized value of the number of hydroxyl groups contained in the molecule is 180 or more, and the perfluoropolyether-based compound is in a region below a line connecting a point (A) where the number-average molecular weight is 1000 and the normalized value of the number of hydroxyl groups contained in the molecule is 400 to a point (B) where the number-average molecular weight is 6000 and the normalized value of the number of hydroxyl groups contained in the molecule is 1600, and further, the perfluoropolyether-based compound has at least one hydroxyl group around a center of a molecular chain.

(Configuration 2) A lubricant for a magnetic disk according to Configuration 1, wherein the number of hydroxyl groups around the center of the molecular chain is two or more.

(Configuration 3) A lubricant for a magnetic disk according to Configuration 1, wherein the number of hydroxyl groups around the center of the molecular chain is three or more.

(Configuration 4) A lubricant for a magnetic disk according to any one of Configurations 1 to 3, wherein the perfluoropolyether-based compound is a compound in which perfluoropolyether groups are bonded to each other through a divalent linking group.

(Configuration 5) A lubricant for a magnetic disk, said lubricant containing a compound in which perfluoropolyether groups are bonded to each other through a divalent linking group, the compound having at least one hydroxyl group around a center of a molecular chain.

(Configuration 6) A lubricant for a magnetic disk according to Configuration 5, wherein a viscosity of the lubricant at −10° C. is in the range of 5000 to 12000 mPa·s.

(Configuration 7) A lubricant for a magnetic disk according to Configuration 6, wherein an amount of change in viscosity relative to a change in temperature is in the range of −0.03 to −0.08 mPa·s/° C.

(Configuration 8) A lubricant for a magnetic disk, the lubricant comprising a compound in which perfluoropolyether groups each having a perfluoropolyether main chain in a structure thereof and each having a hydroxyl group at an end thereof are bonded to each other through a divalent linking group having at least three hydroxyl groups in a structure thereof.

(Configuration 9) A lubricant for a magnetic disk according to Configuration 8, wherein the divalent linking group has 3 to 6 hydroxyl groups in the structure thereof.

(Configuration 10) A lubricant for a magnetic disk according to Configuration 8 or 9, wherein the divalent linking group includes a group represented by —(CR$_1$R$_2$)— (R$_1$ and R$_2$ are each a hydrogen atom or a hydroxyl group).

(Configuration 11) A lubricant for a magnetic disk according to any one of Configurations 8 to 10, wherein the perfluoropolyether group includes a group represented by a formula (I):

HOCH$_2$CF$_2$(OC$_2$F$_4$)$m$(OCF$_2$)$n$OCF$_2$CH$_2$O— [Chemical Formula 1]

(in the formula, m and n are each an integer of 1 or more).

(Configuration 12) A lubricant for a magnetic disk, the lubricant containing a compound of a reaction product between 2 equivalents of a perfluoropolyether compound and 1 equivalent of an aliphatic compound, the 2 equivalents of a perfluoropolyether compound having a perfluoropolyether main chain in a molecule and having hydroxyl groups at ends thereof, the 1 equivalent of an aliphatic compound having epoxide structures at molecular ends thereof, the epoxide structures each capable of reacting with the perfluoropolyether compound to form a hydroxyl group.

(Configuration 13) A process for producing a lubricant for a magnetic disk comprising reacting 2 equivalents of a perfluoropolyether compound with 1 equivalent of an aliphatic compound, the 2 equivalents of a perfluoropolyether compound having a perfluoropolyether main chain in a molecule and having hydroxyl groups at ends thereof, the 1 equivalent of an aliphatic compound having structures each capable of reacting with the perfluoropolyether compound to form a hydroxyl group.

(Configuration 14) A process for producing a lubricant for a magnetic disk according to Configuration 13, wherein the aliphatic compound includes a compound having at least one hydroxyl group in a molecule and having epoxide structures at ends thereof.

(Configuration 15) A process for producing a lubricant for a magnetic disk according to Configuration 13 or 14, wherein the perfluoropolyether compound includes a compound represented by a formula (II):

HOCH$_2$CF$_2$(OC$_2$F$_4$)$m$(OCF$_2$)$n$OCF$_2$CH$_2$OH [Chemical Formula 2]

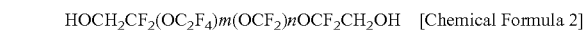

(in the formula, m and n are each an integer of 1 or more).

(Configuration 16) A lubricant for a magnetic disk, the lubricant comprising a compound in which perfluoropolyether groups are bonded to each other through a divalent aliphatic group, each of the perfluoropolyether groups having a perfluoropolyether main chain in a structure thereof, and a hydroxyl group at an end thereof, and further having a hydroxyl group on a side closer to a bond than the perfluoropolyether main chain.

(Configuration 17) A lubricant for a magnetic disk according to Configuration 16, wherein the divalent aliphatic group includes a group represented by —(CR$_1$R$_2$)p- (R$_1$ and R$_2$ are each a hydrogen atom or a substituent and p is an integer of 1 or more).

(Configuration 18) A lubricant for a magnetic disk according to Configuration 16 or 17, wherein the perfluoropolyether group includes a group represented by a formula (III)

[Chemical Formula 3]

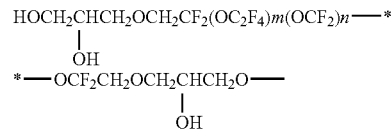

(in the formula, m and n are each an integer of 1 or more).

(Configuration 19) A lubricant for a magnetic disk, the lubricant containing a compound of a reaction product between 2 equivalents of a perfluoropolyether compound and 1 equivalent of an aliphatic compound, the 2 equivalents of a perfluoropolyether compound having a perfluoropolyether main chain in a molecule and having hydroxyl groups at ends thereof, the 1 equivalent of an aliphatic compound having substituents at molecular ends thereof, the substituents each capable of reacting with the perfluoropolyether compound.

(Configuration 20) A process for producing a lubricant for a magnetic disk, comprising reacting 2 equivalents of a perfluoropolyether compound with 1 equivalent of an aliphatic, the 2 equivalents of a perfluoropolyether compound having a perfluoropolyether main chain in a molecule and having hydroxyl groups at ends thereof, the 1 equivalent of an aliphatic compound having structures each capable of reacting with the perfluoropolyether compound.

(Configuration 21) A process for producing a lubricant for a magnetic disk according to Configuration 20, wherein the perfluoropolyether compound includes a compound represented by a formula (IV):

[Chemical Formula 4]

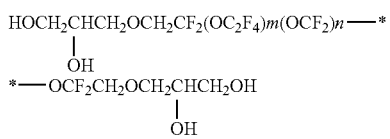

(in the formula, m and n are each an integer of 1 or more).

(Configuration 22) A lubricant for a magnetic disk, the lubricant comprising a compound in which perfluoropolyether groups are bonded to each other through a divalent aromatic group, each of the perfluoropolyether groups having a perfluoropolyether main chain in a structure thereof, and a hydroxyl group at an end thereof, and further having a hydroxyl group on a side closer to a bond than the perfluoropolyether main chain.

(Configuration 23) A lubricant for a magnetic disk, the lubricant comprising a compound in which perfluoropolyether groups are bonded to each other through a divalent saturated cyclic hydrocarbon group, each of the perfluoropolyether groups having a perfluoropolyether main chain in a structure thereof, and a hydroxyl group at an end thereof, and further having a hydroxyl group on a side closer to a bond than the perfluoropolyether main chain.

(Configuration 24) A lubricant for a magnetic disk according to Configuration 22 or 23, wherein the perfluoropolyether group includes a group represented by a formula (III):

[Chemical Formula 5]

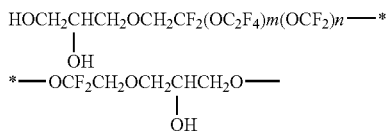

(in the formula, m and n are each an integer of 1 or more).

(Configuration 25) A lubricant for a magnetic disk, the lubricant containing a compound of a reaction product between 2 equivalents of a perfluoropolyether compound and 1 equivalent of an aromatic compound, the 2 equivalents of a perfluoropolyether compound having a perfluoropolyether main chain in a molecule and having hydroxyl groups at ends thereof, the 1 equivalent of an aromatic compound having substituents or epoxide structures each capable of reacting with the perfluoropolyether compound.

(Configuration 26) A lubricant for a magnetic disk, the lubricant containing a compound of a reaction product between 2 equivalents of a perfluoropolyether compound and 1 equivalent of a saturated cyclic hydrocarbon compound, the 2 equivalents of a perfluoropolyether compound having a perfluoropolyether main chain in a molecule and having hydroxyl groups at ends thereof, the 1 equivalent of a saturated cyclic hydrocarbon compound having substituents each capable of reacting with the perfluoropolyether compound.

(Configuration 27) A process for producing a lubricant for a magnetic disk, comprising reacting 2 equivalents of a perfluoropolyether compound with 1 equivalent of an aromatic compound, the 2 equivalents of a perfluoropolyether compound having a perfluoropolyether main chain in a molecule and having hydroxyl groups at ends thereof, the 1 equivalent of an aromatic compound having structures each capable of reacting with the perfluoropolyether compound.

(Configuration 28) A process for producing a lubricant for a magnetic disk, comprising reacting 2 equivalents of a perfluoropolyether compound with 1 equivalent of a saturated cyclic hydrocarbon compound, the 2 equivalents of a perfluoropolyether compound having a perfluoropolyether main chain in a molecule and having hydroxyl groups at ends thereof, said 1 equivalent of a saturated cyclic hydrocarbon compound having structures each capable of reacting with the perfluoropolyether compound.

(Configuration 29) A process for producing a lubricant for a magnetic disk according to Configuration 27 or 28, wherein the perfluoropolyether compound includes a compound represented by a formula (IV):

[Chemical Formula 6]

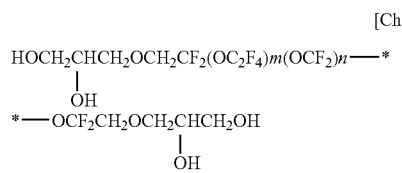

(in the formula, m and n are each an integer of 1 or more).

(Configuration 30) A magnetic disk having a magnetic layer, a protective layer, and a lubricating layer over a substrate, the magnetic disk wherein the lubricating layer contains a lubricant for a magnetic disk according to any one of Configurations 1 to 29.

(Configuration 31) A magnetic disk according to Configuration 30, wherein the protective layer is a carbon-based protective layer.

(Configuration 32) A magnetic disk according to Configuration 30 or 31, the magnetic disk being adapted to be mounted in a magnetic disk apparatus of a load unload system.

In the invention of Configuration 1, according to the magnetic-disk lubricant containing the perfluoropolyether-based compound in which the relationship between the number-average molecular weight and the normalized value of the number of hydroxyl groups contained in a molecule falls within the predetermined range and further the perfluoropolyether-based compound has at least one hydroxyl group around the center of the molecular chain, it is possible to improve the heat resistance without extremely increasing the number-average molecular weight. Further, when the lubricant of this invention is coated on a protective layer, proper interaction occurs between the hydroxyl groups of the lubricant and the protective layer to improve the adhesion between a lubricating layer and the protective layer and, therefore, even if the thickness of the lubricating layer is reduced, it is possible to sufficiently cover the surface of the protective layer, thus enabling a reduction in thickness of the lubricating layer.

As described in Configuration 2, the number of hydroxyl groups around the center of the molecular chain is preferably two or more and, particularly, as described in Configuration 3, the number of hydroxyl groups around the center of the molecular chain is preferably three or more.

According to the invention of Configuration 4, since the perfluoropolyether-based compound is the compound in which the perfluoropolyether groups are bonded to each other through the divalent linking group, it is possible, by dimerizing the above perfluoropolyether, to obtain a high molecular weight lubricant without extremely increasing the molecular weight, thus improving the heat resistance.

With respect to the invention of Configuration 5, according to the magnetic-disk lubricant containing the compound in which the perfluoropolyether groups are bonded to each other through the divalent linking group and which has at least one hydroxyl group around the center of the molecular chain, it is possible, by dimerizing the above perfluoropolyether, to obtain a high molecular weight lubricant without extremely increasing the molecular weight and thus to improve the heat resistance and, further, it is possible to improve the adhesion between a lubricating layer and a protective layer, so that even if the thickness of the lubricating layer is reduced, it is possible to sufficiently cover the surface of the protective layer, thus enabling a reduction in thickness of the lubricating layer.

As described in Configuration 6, since, in the invention of Configuration 5, the viscosity at −10° C. is in the range of 5000 to 12000 mPa·s, it is possible to obtain excellent flow properties even at low temperatures and thus to obtain high reliability when used at low temperatures.

Further, as described in Configuration 7, since the amount of change in viscosity relative to a change in temperature is in the range of −0.03 to −0.08 mPa·s/° C., the change in flow properties is small over a wide range from low to high temperatures and thus the stable lubricating performance can be obtained.

According to the invention of Configuration 8, since the magnetic-disk lubricant comprising the compound has at least three hydroxyl groups at the center of a molecule in addition to hydroxyl groups at the ends of the molecule, when the lubricant of this invention is coated on a protective layer, proper interaction occurs between the hydroxyl groups of the lubricant and the protective layer to improve the adhesion between a lubricating layer and the protective layer. In the compound, the perfluoropolyether groups are bonded to each other through the divalent linking group. Each of the perfluoropolyether groups has the perfluoropolyether main chain in the structure thereof and a hydroxyl group at an end thereof. The divalent linking group has at least three hydroxyl groups in the structure thereof.

Further, by the occurrence of proper interaction between the hydroxyl groups of the lubricant and the protective layer, it is possible to form a lubricant layer (lubricating layer) in which lubricant molecules adequately have a folding structure on the protective layer. As a result, even if the thickness of the lubricating layer is reduced, it is possible to sufficiently cover the surface of the protective layer and thus the lubricating layer can be uniformly formed on the surface of a magnetic disk. Therefore, it is possible to reduce the thickness of the lubricating layer while achieving high coverage. Further, since the magnetic-disk lubricant of this invention comprises the compound in which the above perfluoropolyether groups are bonded to each other through the above divalent linking group, it is possible to obtain a high molecular weight lubricant by dimerizing the above perfluoropolyether and thus thermal decomposition can be suppressed. Therefore, when a magnetic disk is manufactured using such a lubricant, it is possible to improve the heat resistance thereof.

As described above, the magnetic-disk lubricant of this invention is excellent in properties such as, particularly, coverage of a protective layer, adhesion to the protective layer, and heat resistance and thus can achieve a further reduction in thickness of a lubricating layer required for reducing the magnetic spacing between a magnetic head and a recording layer of a magnetic disk, and further, it is excellent in long-term stability of a formed lubricating layer, so that it is suitable for realizing a magnetic disk having high reliability even with the low flying height of a magnetic head following the increase in recording density in recent years and with very strict environmental resistance following the diversification of applications.

According to the invention of Configuration 9, it is particularly preferable that, in the invention of Configuration 8, the above divalent linking group have 3 to 6 hydroxyl groups in the structure thereof. If the number of hydroxyl groups present at the center of a lubricant molecule is small, the adhesion improvement effect by the interaction with a protective layer cannot be obtained sufficiently. On the other hand, however large the number of these hydroxyl groups may be, not all the hydroxyl groups are oriented toward the protective layer side to contribute to proper interaction with the protective layer and thus it is not that the effect of improvement in adhesion to the protective layer increases corresponding to the number of hydroxyl groups in the molecule.

According to the invention of Configuration 10, since the above divalent linking group is the group having the group represented by —($CR_1R_2$)— ($R_1$ and $R_2$ are each a hydrogen atom or a hydroxyl group), it is possible to suitably introduce hydroxyl groups around the center of a lubricant molecule.

Further, according to the invention of Configuration 11, the above perfluoropolyether group is preferably the group represented by the above formula (I).

In the inventions of Configurations 12 and 13, according to the magnetic-disk lubricant obtained by reacting 2 equivalents of the perfluoropolyether compound having the perfluoropolyether main chain in a molecule and having the hydroxyl groups at the ends thereof with 1 equivalent of the aliphatic compound having the structures each capable of reacting with the perfluoropolyether compound to form a hydroxyl group and according to the process for producing such a magnetic-disk lubricant, it is possible to suitably obtain a magnetic-disk lubricant of this invention that is a compound in which at least three hydroxyl groups are introduced at the center of a molecule in addition to hydroxyl groups at the ends of the molecule by linking perfluoropolyether compounds each having hydroxyl groups only at the molecular ends thereof to dimerize them and that is excellent in properties such as coverage of a protective layer, adhesion to the protective layer, and heat resistance and thus can achieve a further reduction in thickness of a lubricating layer.

According to the invention of Configuration 14, it is preferable that, in the invention of Configuration 13, the above aliphatic compound is the compound having at least one hydroxyl group in a molecule and having the epoxide structures at the ends thereof. Using such a compound, it is possible to obtain a lubricant of this invention with high purity and with high yield.

Further, according to the invention of Configuration 15, the above perfluoropolyether compound is preferably the compound represented by the above formula (II).

According to the invention of Configuration 16, the magnetic-disk lubricant comprising the compound in which the perfluoropolyether groups are bonded to each other through the divalent aliphatic group. Each of the perfluoropolyether groups has the perfluoropolyether main chain in the structure thereof and a hydroxyl group at an end thereof, and further has a hydroxyl group on the side closer to the bond than the perfluoropolyether main chain. The compound has hydroxyl groups near the divalent aliphatic group, i.e. around the center of a molecule, in addition to hydroxyl groups at the ends of the molecule, when the lubricant of this invention is coated on a protective layer, it is possible to form a lubricant layer (lubricating layer) in which lubricant molecules adequately have a folding structure on the protective layer due to the interaction between the hydroxyl groups of the lubricant and the protective layer.

Further, by changing the length (e.g. the number of carbons in the main chain) of the aliphatic group, it is possible to adjust the position of the hydroxyl groups around the center of the molecule. As a result, it is possible to control the folding structure of lubricant molecules formed on the protective layer to adjust the thickness of the lubricating layer. That is, detailed tuning of the molecular structure is enabled by adjusting the length of the aliphatic group so that it is possible to strictly control the thickness of the lubricating layer on the molecular level. Further, by carrying out the strict thickness control on the molecular level, even if the thickness of the lubricating layer is reduced, it is possible to sufficiently cover the surface of the protective layer and thus the lubricating layer can be uniformly formed on the surface of a magnetic disk, thus enabling a reduction in thickness of the lubricating layer while achieving high coverage. Therefore, the magnetic-disk lubricant of this invention can achieve a further reduction in thickness of a lubricating layer required for reducing the magnetic spacing between a magnetic head and a recording layer of a magnetic disk, and further, it is excellent in long-term stability of a formed lubricating layer, so that it is suitable for realizing a magnetic disk having high reliability even with the low flying height of a magnetic head following the increase in recording density in recent years.

According to the invention of Configuration 17, since, in the invention of Configuration 16, the above divalent aliphatic group is the group represented by —$(CR_1R_2)_p$— ($R_1$ and $R_2$ are each a hydrogen atom or a substituent and p is an integer of 1 or more), the length of the aliphatic group can be changed by the number of carbons in the main chain thereof so that it is possible to adjust the position of hydroxyl groups around the center of a lubricant molecule.

Further, according to the invention of Configuration 18, the above perfluoropolyether group is preferably the group represented by the above formula (III).

In the inventions of Configurations 19 and 20, the magnetic-disk lubricant and the process for producing the same are disclosed. The magnetic-disk lubricant is a reaction product between 2 equivalents of the perfluoropolyether compound and 1 equivalent of the aliphatic compound having the structures each capable of reacting with the perfluoropolyether compound. The 2 equivalents of the perfluoropolyether compound has the perfluoropolyether main chain in a molecule and having the hydroxyl groups at the ends thereof. The 1 equivalent of the aliphatic compound has the structures each capable of reacting with the perfluoropolyether compound. Thus, according to the process for producing such a magnetic-disk lubricant, it is possible to obtain a magnetic-disk lubricant suitable for this invention in which hydroxyl groups are introduced near an aliphatic group, i.e. around the center of a molecule, in addition to hydroxyl groups at the ends of the molecule by linking perfluoropolyether compounds each having hydroxyl groups only at the molecular ends thereof to dimerize them and, further, the position of the hydroxyl groups around the center of the molecule is arbitrarily adjusted using the aliphatic group different in length.

Further, according to the invention of Configuration 21, it is preferable that, in the invention of Configuration 20, the above perfluoropolyether compound be the compound represented by the above formula (IV).

According to the invention of Configuration 22, the magnetic-disk lubricant of this invention comprises the compound. In the compound, the perfluoropolyether groups are bonded to each other through the divalent aromatic group. Each of the perfluoropolyether groups has the perfluoropolyether main chain in the structure thereof and a hydroxyl group at an end thereof, and further has a hydroxyl group on the side closer to the bond than the perfluoropolyether main chain. The compound has hydroxyl groups near both sides of the divalent aromatic group present at the center of a molecule in addition to hydroxyl groups at both ends of the molecule. Therefore, when the lubricant of this invention is coated on a protective layer, the lubricant interacts with the protective layer due to a π-electron cloud of the aromatic group present at the center of the lubricant molecule. Accordingly, the lubricant molecule adheres to the protective layer. Following this, the hydroxyl groups present on both sides of the aromatic group tend to be arranged on the surface of the protective layer. Therefore, in addition to the interaction between the hydroxyl groups at both ends of the lubricant molecule and the protective layer, proper interaction occurs between the hydroxyl groups on both sides of the aromatic group and the protective layer. As a result, the adhesion of a lubricating layer is improved due to the interaction between the hydroxyl groups of the lubricant and the protective layer conjointly with the interaction with the protective layer by the π electron cloud of the aromatic group present at the center of the lubricant molecule. By the interactions described above, it is possible to form a lubricant layer (lubricating layer) in which lubricant molecules adequately have a folding structure on a protective layer. Therefore, even if the thickness of the lubricating layer is reduced, it is possible to form a uniform lubricating layer sufficiently covering the surface of a magnetic disk, thus obtaining the lubricating layer with high durability.

According to the invention of Configuration 23, the magnetic-disk lubricant of this invention comprises the compound. In the compound, the perfluoropolyether groups are bonded to each other through the divalent saturated cyclic hydrocarbon group. Each of the perfluoropolyether groups has the perfluoropolyether main chain in the structure thereof, and a hydroxyl group at an end thereof, and further has a hydroxyl group on the side closer to the bond than the perfluoropolyether main chain. The compound has hydroxyl groups near both sides of the divalent saturated cyclic hydrocarbon group present at the center of a molecule in addition to hydroxyl groups at both ends of the molecule. Therefore, when the lubricant of this invention is coated on a protective layer, the saturated cyclic hydrocarbon group present at the center of the lubricant molecule interacts with the protective layer by the intermolecular force, i.e. the van der Waals force. Accordingly, the lubricant molecule adheres to the protective layer. Following this, the hydroxyl groups present on both sides of the saturated cyclic hydrocarbon group tend to be arranged on the surface of the protective layer and, therefore, in addition to the interaction between the hydroxyl groups at both ends of the lubricant molecule and the protective layer, proper interaction occurs between the hydroxyl groups on both sides of the saturated cyclic hydrocarbon group and the protective layer. As a result, the adhesion of a lubricating layer is improved due to the interaction between the hydroxyl groups of the lubricant and the protective layer conjointly with the interaction with the protective layer by the intermolecular force of the saturated cyclic hydrocarbon group present at the center of the lubricant molecule. By the interactions described above, it is possible to form a lubricant layer (lubricating layer) in which lubricant molecules adequately have a folding structure on a protective layer. Therefore, even if the thickness of the lubricating layer is reduced, it is possible to form a uniform lubricating layer sufficiently covering the surface of a magnetic disk, thus obtaining the lubricating layer with high durability.

Further, according to the invention of Configuration 24, it is preferable that, in the invention of Configuration 22 or 23, the above perfluoropolyether group be the group represented by the above formula (III).

In the inventions of Configurations 25 and 27, the magnetic-disk lubricant and the process for producing the same are disclosed. The magnetic-disk lubricant is a reaction product between 2 equivalents of the perfluoropolyether compound and 1 equivalent of the aromatic compound. The 2 equivalents of the perfluoropolyether compound has the perfluoropolyether main chain in a molecule and the hydroxyl groups at the ends thereof. The 1 equivalent of the aromatic compound has the structures each capable of reacting with the perfluoropolyether compound. Thus, according to the process for producing such a magnetic-disk lubricant, it is possible to obtain a magnetic-disk lubricant suitable for this invention in which hydroxyl groups are introduced near both sides of an aromatic group, i.e. around the center of a molecule, in addition to hydroxyl groups at the ends of the molecule by linking, through the aromatic group, perfluoropolyether compounds each having hydroxyl groups only at the molecular ends thereof to dimerize them.

In the inventions of Configurations 26 and 28, the magnetic-disk lubricant and the process for producing the same are disclosed. The magnetic-disk lubricant is a reaction product between 2 equivalents of the perfluoropolyether compound with and 1 equivalent of the saturated cyclic hydrocarbon compound. The 2 equivalents of the perfluoropolyether compound has the perfluoropolyether main chain in a molecule and the hydroxyl groups at the ends thereof. The 1 equivalent of the saturated cyclic hydrocarbon compound has the structures each capable of reacting with the perfluoropolyether compound. Thus, according to the process for producing such a magnetic-disk lubricant, it is possible to obtain a magnetic-disk lubricant suitable for this invention in which hydroxyl groups are introduced near both sides of a saturated cyclic hydrocarbon group, i.e. around the center of a molecule, in addition to hydroxyl groups at the ends of the molecule by linking, through the saturated cyclic hydrocarbon group, perfluoropolyether compounds each having hydroxyl groups only at the molecular ends thereof to dimerize them.

Further, according to the invention of Configuration 29, the above perfluoropolyether compound is preferably the compound represented by the above formula (IV).

According to the invention of Configuration 30, in the magnetic disk having the magnetic layer, the protective layer, and the lubricating layer over the substrate, the lubricating layer contains the magnetic-disk lubricant of this invention. Therefore, it is possible to obtain a high-coverage uniform lubricating layer capable of, even with a reduced thickness, sufficiently covering the surface of the protective layer and excellent in heat resistance and adhesion to the protective layer. Thus, it is possible to achieve a further reduction in thickness of a lubricating layer required for reducing the magnetic spacing, so that it is possible to provide a magnetic disk having high reliability even with the low flying height of a magnetic head following the increase in recording density in recent years and with very strict environmental resistance following the diversification of applications.

According to the invention of Configuration 31, since the above protective layer is the carbon-based protective layer in the invention of Configuration 30, the interaction between the hydroxyl groups of the magnetic-disk lubricant of this invention and the protective layer is further enhanced so that the operation and effect according to this invention are exhibited more preferably.

Further, as described in Configuration 32, the magnetic disk having the lubricating layer containing the lubricant of this invention is particularly suitable as a magnetic disk adapted to be mounted in a magnetic disk apparatus of the load unload system.

Effect of the Invention

According to a lubricant for a magnetic disk of this invention, it is possible to form a high-coverage uniform lubricating layer capable of, even with a reduced thickness, sufficiently covering the surface of a protective layer and excellent in heat resistance and adhesion to the protective layer.

According to a magnetic-disk lubricant production process of this invention, it is possible to suitably produce a lubricant for a magnetic disk of this invention in which hydroxyl groups are introduced at the molecular ends and further at the center of a molecule.

According to a magnetic disk of this invention, by forming on a magnetic disk surface a lubricating layer containing a lubricant obtained by this invention, it is possible to obtain the high-coverage lubricating layer capable of, even with a reduced thickness, sufficiently covering the surface of a protective layer and excellent in heat resistance and adhesion to the protective layer and therefore it is possible to achieve a further reduction in thickness of the lubricating layer required for reducing the magnetic spacing, so that it is possible to provide a magnetic disk having high reliability even with the low flying height of a magnetic head following the increase in recording density in recent years and with very strict environmental resistance following the diversification of applications.

DESCRIPTION OF SYMBOLS

| | |
|---|---|
| 1 | substrate |
| 2a | adhesive layer |
| 2b | underlayer |
| 3 | magnetic layer |
| 4 | carbon-based protective layer |
| 5 | lubricating layer |
| 10 | magnetic disk |

BEST MODE FOR CARRYING OUT THE INVENTION

Hereinbelow, this invention will be described in detail by embodiments thereof.

A lubricant for a magnetic disk according to this invention contains a perfluoropolyether-based compound in which the relationship between a number-average molecular weight and a normalized value of the number of hydroxyl groups contained in a molecule falls within a predetermined range, i.e. the number-average molecular weight is in the range of 1000 to 6000, the normalized value of the number of hydroxyl groups contained in the molecule is 180 or more, and the perfluoropolyether-based compound is in a region below a line connecting a point (A) where the number-average molecular weight is 1000 and the normalized value of the number of hydroxyl groups contained in the molecule is 400 to a point (B) where the number-average molecular weight is 6000 and the normalized value of the number of hydroxyl groups contained in the molecule is 1600, and further, the perfluoropolyether-based compound has at least one hydroxyl group around the center of a molecular chain.

In this invention, a normalized value of the number of hydroxyl groups contained in a molecule (hereinafter referred to as EW (Equivalent Weight) in the specification) is a value obtained by dividing a number-average molecular weight by the number of hydroxyl groups. For example, in a compound where the number-average molecular weight is 5000 and the number of hydroxyl groups contained in a molecule is 5, EW is 1000.

Figure 2:
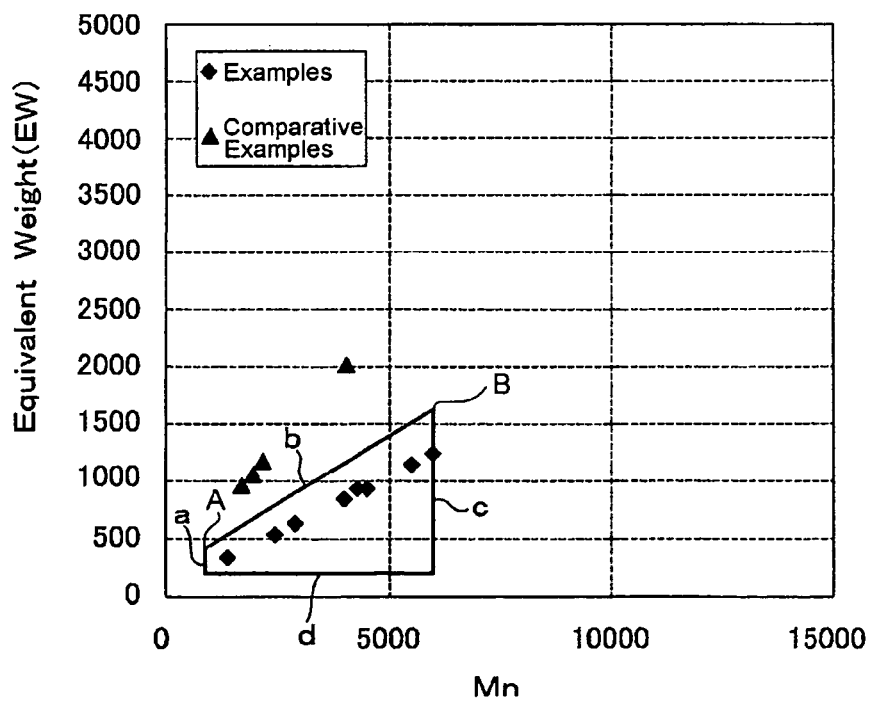
FIG. 2 is a diagram for explaining the relationship between the number-average molecular weight and the normalized value of the number of hydroxyl groups contained in a molecule in each of magnetic-disk lubricants of this invention.

FIG. 2 is a graph with the ordinate axis representing EW and the abscissa axis representing number-average molecular weight Mn, wherein a range surrounded by segments a to d is the above predetermined range representing the relationship between the number-average molecular weight and EW in the magnetic-disk lubricant of this invention. The segment a represents Mn of 1000. If Mn becomes less than 1000, the amount of evaporation of a lubricant becomes large and thus the heat resistance degrades. The segment b is the line connecting the point (A) where Mn is 1000 and EW is 400 to the point (B) where Mn is 6000 and EW is 1600. This straight line b represents the upper limit of EW necessary for obtaining proper adhesion performance to a protective layer. If EW becomes greater than it, the pickup of a lubricant (phenomenon in which a lubricant adsorbs to a head) tends to occur. Further, the viscosity becomes too small and thus the migration tends to occur. The segment c represents Mn of 6000. If Mn exceeds 6000, the viscosity becomes very large so that the lubricating performance decreases and the self-repair properties decrease. The segment d represents EW of 180. If EW becomes less than 180, the ratio of hydroxyl groups in a lubricant molecule becomes very high and thus the lubricating performance decreases. Further, it impedes the formation of low surface energy by a fluorine-based lubricant.

According to the magnetic-disk lubricant of this invention described above, it is possible to improve the heat resistance without extremely increasing the number-average molecular weight. Further, when the lubricant of this invention is coated on a protective layer, proper interaction occurs between the hydroxyl groups of the lubricant and the protective layer to improve the adhesion between a lubricating layer and the protective layer and, therefore, even if the thickness of the lubricating layer is reduced, it is possible to sufficiently cover the surface of the protective layer, thus enabling a reduction in thickness of the lubricating layer.

In the above lubricant, the number of hydroxyl groups around the center of the molecular chain is preferably two or more and, particularly, the number of hydroxyl groups around the center of the molecular chain is preferably three or more.

Further, the above lubricant is a compound in which perfluoropolyether groups are bonded to each other through a divalent linking group, and therefore it is possible, by dimerizing the above perfluoropolyether, to obtain a high molecular weight lubricant without extremely increasing the molecular weight, thus improving the heat resistance.

A lubricant for a magnetic disk according to this invention is preferably a lubricant containing a compound in which perfluoropolyether groups are bonded to each other through a divalent linking group and which has at least one hydroxyl group around the center of a molecular chain. According to this lubricant, by dimerizing the above perfluoropolyether, it is possible to obtain a high molecular weight lubricant without extremely increasing the molecular weight and thus to improve the heat resistance and, further, it is possible to improve the adhesion between a lubricating layer and a protective layer. Therefore, even if the thickness of the lubricating layer is reduced, it is possible to sufficiently cover the surface of the protective layer, thus enabling a reduction in thickness of the lubricating layer.

The viscosity of the above lubricant at $-10°$ C. is in the range of 5000 to 12000 mPa·s so that it is possible to obtain excellent flow properties even at low temperatures and thus to obtain high reliability even when used at low temperatures.

Further, in the lubricant of this invention, the amount of change in viscosity relative to a change in temperature is preferably in the range of $-0.03$ to $-0.08$ mPa·s/$°$ C. By this, the change in flow properties is small over a wide range from low to high temperatures and thus the stable lubricating performance can be obtained.

First Embodiment of Lubricant

The above magnetic-disk lubricant according to this invention comprises, for example, a compound in which perfluoropolyether groups each having a perfluoropolyether main chain in a structure thereof and each having a hydroxyl group at an end thereof are bonded to each other through a divalent linking group having at least three hydroxyl groups in a structure thereof.

The above divalent linking group has at least three hydroxyl groups in the structure thereof and, for example, includes a group represented by —$(CR_1R_2)$— where $R_1$ and $R_2$ are each a hydrogen atom or a hydroxyl group.

It is particularly preferable that the above divalent linking group have 3 to 6 hydroxyl groups in the structure thereof. The reason is that if the number of hydroxyl groups present at the center of a lubricant molecule is small, the adhesion improvement effect by the interaction with a protective layer cannot be obtained sufficiently and, conversely, however large the number of these hydroxyl groups may be, not all the hydroxyl groups are oriented toward the protective layer side to contribute to proper interaction with the protective layer and thus it is not that the effect of improvement in adhesion to the protective layer increases corresponding to the number of hydroxyl groups in the molecule.

The above perfluoropolyether group has, in its structure, a perfluoropolyether main chain represented by, for example, —(O—$C_2F_4$)m-(O—$CF_2$)n- (m and n are each an integer of 1 or more) and has a hydroxyl group (preferably at least two hydroxyl groups) at an end thereof. A group represented by, for example, the following formula (I) is preferably cited as such a perfluoropolyether group.

Formula (I)

$HOCH_2CF_2(OC_2F_4)m(OCF_2)nOCF_2CH_2O$— [Chemical Formula 7]

In the formula, m and n are each an integer of 1 or more.

Since the magnetic-disk lubricant according to this invention described above has at least three hydroxyl groups at the center of a molecule in addition to hydroxyl groups at the ends of the molecule, when the lubricant of this invention is coated on a protective layer, proper interaction occurs between the hydroxyl groups of the lubricant and the protective layer to improve the adhesion between a lubricating layer and the protective layer. Further, by the occurrence of proper interaction between the hydroxyl groups of the lubricant and the protective layer, it is possible to form a lubricant layer (lubricating layer) in which lubricant molecules adequately have a folding structure on the protective layer and, therefore, even if the thickness of the lubricating layer is reduced, it is possible to sufficiently cover the surface of the protective layer and thus the lubricating layer can be uniformly formed on the surface of a magnetic disk. As the lubricating layer coverage increases, it represents that the surface of the magnetic disk is more uniformly covered with the lubricating layer, and thus it is possible to suppress the head crash failure and the corrosion failure. That is, as the lubricating layer coverage increases, the surface of the magnetic disk is more protected so that the lubricating performance of the surface of the magnetic disk is high and further it is possible to protect the surface of the magnetic disk from substances that tend to cause the corrosion failure or the fly stiction failure, such as acid-based contaminants or siloxane-based contaminants present in an atmosphere inside a magnetic disk apparatus.

Further, since the magnetic-disk lubricant of this invention comprises the compound in which the above perfluoropolyether groups are bonded to each other through the above divalent linking group, it is possible to obtain a high molecular weight lubricant by dimerizing the above perfluoropolyether and thus to suppress a reduction in molecular weight due to thermal decomposition. Therefore, when a magnetic disk is manufactured using such a lubricant, it is possible to improve the heat resistance thereof. Because of the further reduction in magnetic head flying height (10 nm or less) following the increase in recording density in recent years, the possibility becomes high that contact or friction between a magnetic head and the surface of a magnetic disk frequently occurs. When the magnetic head is brought in contact with the surface of the magnetic disk, there occurs a case where the magnetic head does not immediately go out of contact with the surface of the magnetic disk, but slides with friction for a while. Further, because of recording/reproduction performed by the high-speed rotation of a magnetic disk in recent years, heat due to contact or friction is generated more than conventional. Therefore, it is concerned that the possibility becomes higher than conventional that a material of a lubricating layer on the surface of the magnetic disk is thermally decomposed due to the generation of such heat, so that data read/write is subjected to failure due to adhesion, to a magnetic head, of the lubricant thermally decomposed to decrease in molecular weight and increase in fluidity. Further, in consideration of data recording/reproduction in the state where a magnetic head and a magnetic disk are in contact with each other in near future, an influence of heat generation due to the constant contact is further concerned. Taking this situation into account, it is desired that heat resistance required for a lubricating layer be further improved, and thus the lubricant of this invention is exactly suitable.

As described above, the magnetic-disk lubricant of this invention is excellent in properties such as, particularly, adhesion to a protective layer, coverage of the protective layer, and heat resistance and thus can achieve a further reduction in thickness of a lubricating layer required for reducing the magnetic spacing between a magnetic head and a recording layer of a magnetic disk, and further, it is excellent in long-term stability of a formed lubricating layer, so that it is suitable for realizing a magnetic disk having high reliability (capable of ensuring stable operation) even with the low flying height of a magnetic head following the increase in recording density in recent years and with very strict environmental resistance following the diversification of applications.

As a magnetic-disk lubricant production process according to this invention, there is preferably cited, for example, a production process comprising reacting 2 equivalents of a perfluoropolyether compound having a perfluoropolyether main chain in a molecule and having hydroxyl groups at the ends thereof with 1 equivalent of an aliphatic compound having structures each capable of reacting with the perfluoropolyether compound to form a hydroxyl group.

As the above aliphatic compound, there is preferably cited, for example, a diepoxy compound having at least one hydroxyl group in a molecule and having epoxide structures at the ends thereof. Using such a compound, it is possible to obtain a lubricant of this invention with high purity and with high yield. A specific example of such a diepoxy compound is cited below, but this invention is not limited thereto.

[Chemical Formula 8]

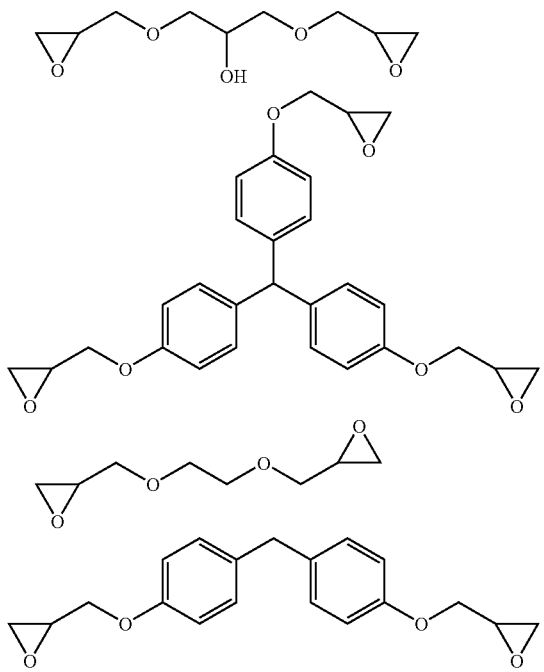

Specifically, under a base condition, for example, with a base catalyst, perfluoropolyether compounds each having hydroxyl groups at the ends thereof are reacted with a base to obtain an alkoxide, then this alkoxide performs a nucleophilic ring-opening reaction with an aliphatic compound having epoxide structures at the ends thereof, thereby obtaining a dimer compound in which the perfluoropolyether compounds are bonded to each other through a linking group changed from the aliphatic compound.

As the above perfluoropolyether compound, there is cited, for example, a perfluorodiol compound having hydroxyl groups at the molecular ends thereof, represented by the following formula (II).

HOCH$_2$CF$_2$(OC$_2$F$_4$)$m$(OCF$_2$)$n$OCF$_2$CH$_2$OH [Chemical Formula 9]

In the formula, m and n are each an integer of 1 or more.

According to the magnetic-disk lubricant production process of this invention described above, it is possible to obtain a magnetic-disk lubricant in which at least three hydroxyl groups are introduced at the center of a molecule in addition to hydroxyl groups at the ends of the molecule by linking perfluoropolyether compounds each having hydroxyl groups only at the molecular ends thereof to dimerize them. For example, when the perfluorodiol compound represented by the above formula (II) is used as the above perfluoropolyether compound and the diepoxy compound exemplified above is used as the above aliphatic compound, there is obtained a lubricant compound having one hydroxyl group at each end of a molecule and three hydroxyl groups at the center of the molecule.

Exemplified compounds of magnetic-disk lubricants of this invention are cited below, but this invention is not limited thereto.

[Chemical Formula 10]

Exemplified Compound

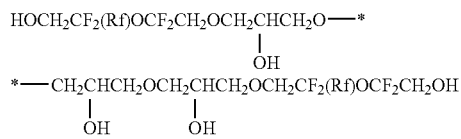

Rf: —(OC$_2$F$_4$)m(OCF$_2$)n- (m, n=an integer of 1 or more)

It is preferable that the molecular weight fractionation of the magnetic-disk lubricant of this invention be carried out by an appropriate method to thereby set the molecular weight dispersion (ratio of weight-average molecular weight (Mw)/number-average molecular weight (Mn)) to 1.3 or less.

In this invention, it is not necessary to particularly limit a method for molecular weight fractionation, but use can be made, for example, of molecular weight fractionation by a gel permeation chromatography (GPC) method, molecular weight fractionation by a supercritical fluid extraction method, or the like.

Second Embodiment of Lubricant

A magnetic-disk lubricant according to this invention comprises, for example, a compound in which perfluoropolyether groups each having a perfluoropolyether main chain in a structure thereof, each having a hydroxyl group at an end thereof, and each further having a hydroxyl group on a side closer to a bond than the perfluoropolyether main chain are bonded to each other through a divalent aliphatic group.

The above divalent aliphatic group is, for example, a group represented by —(CR$_1$R$_2$)p- where R$_1$ and R$_2$ are each a hydrogen atom or a substituent (e.g. hydroxyl group, halogen group, alkyl group, or the like) and p is an integer of 1 or more.

The above perfluoropolyether group has, in its structure, a perfluoropolyether main chain represented by, for example, —(O—C$_2$F$_4$)m-(O—CF$_2$)n- (m and n are each an integer of 1 or more), has a hydroxyl group (preferably at least two hydroxyl groups) at an end thereof, and further has at least one hydroxyl group on a side closer to a bond than the perfluoropolyether main chain. A group represented by, for example, the following formula (III) is preferably cited as such a perfluoropolyether group.

[Chemical Formula 11]

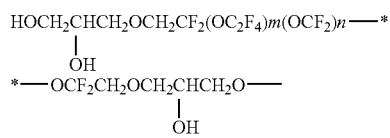

In the formula, m and n are each an integer of 1 or more.

Since the magnetic-disk lubricant according to this invention has hydroxyl groups near the divalent aliphatic group, i.e. around the center of a molecule, in addition to hydroxyl groups at the ends of the molecule, when the lubricant of this invention is coated on a protective layer, it is possible to form a lubricant layer (lubricating layer) in which lubricant molecules adequately have a folding structure on the protective layer due to the interaction between the hydroxyl groups of the lubricant and the protective layer. Further, by changing the length of the aliphatic group, it is possible to adjust the position of the hydroxyl groups around the center of the molecule and, as a result, it is possible to control the folding structure of lubricant molecules formed on the protective layer to adjust the thickness of the lubricating layer.

That is, according to the magnetic-disk lubricant of this invention, detailed tuning of the molecular structure is enabled by adjusting the length of the aliphatic group so that it is possible to strictly control the thickness of the lubricating layer on the molecular level. When the aliphatic group is the group represented by —(CR$_1$R$_2$)p- described above, the length of the aliphatic group can be changed by the number of carbons in the main chain thereof so that it is possible to adjust the position of hydroxyl groups around the center of a lubricant molecule. When the aliphatic group is the group represented by —(CR$_1$R$_2$)p-, the number of carbons in the main chain, i.e. the value of p, is not particularly limited, but in terms of improvement in affinity to the protective layer and of the thickness control, it is, for example, preferably in the range of 1 to 30, more preferably in the range of 2 to 20, and most preferably in the range of 3 to 10.

Further, according to the magnetic-disk lubricant of this invention, by controlling the folding structure of lubricant molecules formed on a protective layer to carry out strict thickness control on the molecular level, even if the thickness of a lubricating layer is reduced, it is possible to sufficiently cover the surface of the protective layer and thus the lubricating layer can be uniformly formed on the surface of a magnetic disk with a high coverage. As the lubricating layer coverage increases, it represents that the surface of the magnetic disk is more uniformly covered with the lubricating layer, and thus it is possible to suppress the head crash failure and the corrosion failure. That is, as the lubricating layer coverage increases, the surface of the magnetic disk is more protected so that the lubricating performance of the surface of the magnetic disk is high and further it is possible to protect the surface of the magnetic disk from substances that tend to cause the corrosion failure or the fly stiction failure, such as acid-based contaminants or siloxane-based contaminants present in an atmosphere inside a magnetic disk apparatus.

Therefore, it is possible to achieve a further reduction in thickness of a lubricating layer required for reducing the magnetic spacing between a magnetic head and a recording layer of a magnetic disk, which is suitable for realizing a magnetic disk having high reliability (capable of ensuring stable operation) even with the low flying height of a magnetic head following the increase in recording density in recent years.

As a magnetic-disk lubricant production process according to this invention, there is preferably cited, for example, a production process comprising reacting 2 equivalents of a perfluoropolyether compound having a perfluoropolyether main chain in a molecule and having hydroxyl groups at the ends thereof with 1 equivalent of an aliphatic compound having structures each capable of reacting with the perfluoropolyether compound (e.g. an aliphatic compound having two halogen groups or epoxide structures at the ends thereof). Specifically, under a base condition, for example, with a base catalyst, perfluoropolyether compounds each having hydroxyl groups at the ends thereof are reacted with a base to obtain an alkoxide, then this alkoxide performs a nucleophilic substitution reaction with an aliphatic compound having halogen groups (or this alkoxide performs a nucleophilic ring-opening reaction with an aliphatic compound having epoxide structures), thereby obtaining a dimer compound in which the perfluoropolyether compounds are linked to each other through an aliphatic group.

As the above perfluoropolyether compound, there is preferably cited, for example, a perfluorotetraol compound having a total of four hydroxyl groups at the molecular ends thereof, represented by the following formula (IV).

[Chemical Formula 12]

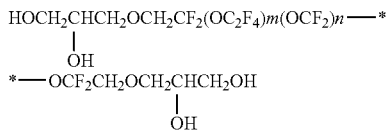

In the formula, m and n are each an integer of 1 or more.

According to the magnetic-disk lubricant production process of this invention described above, it is possible to obtain a magnetic-disk lubricant in which hydroxyl groups are introduced near an aliphatic group, i.e. around the center of a molecule, in addition to hydroxyl groups at the ends of the molecule by linking perfluoropolyether compounds each having hydroxyl groups only at the molecular ends thereof to dimerize them and, further, the position of the hydroxyl groups around the center of the molecule is arbitrarily adjusted using the aliphatic group different in length (the number of carbons in the main chain). For example, when the perfluorotetraol compound represented by the above formula (IV) is used as the above perfluoropolyether compound, there is obtained a lubricant compound having two hydroxyl groups at each molecular end (four in total) and one hydroxyl group near each of both sides of the aliphatic group.

Exemplified compounds of magnetic-disk lubricants of this invention are cited below, but this invention is not limited thereto.

[Chemical Formula 13]

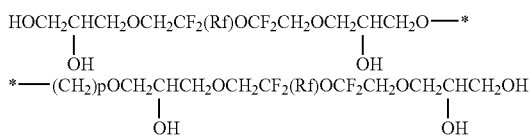

Rf: —($OC_2F_4$)m($OCF_2$)n- (m, n=an integer of 1 or more)

| Exemplified Compound No. | |
|---|---|
| 1 | p = 3 |
| 2 | p = 8 |
| 3 | p = 13 |
| 4 | p = 18 |
| 5 | p = 23 |

Third and Fourth Embodiments of Lubricants

A third embodiment of a magnetic-disk lubricant according to this invention is a lubricant comprising a compound in which perfluoropolyether groups each having a perfluoropolyether main chain in a structure thereof, each having a hydroxyl group at an end thereof, and each further having a hydroxyl group on a side closer to a bond than the perfluoropolyether main chain are bonded to each other through a divalent aromatic group.

As the divalent aromatic group, as also cited in connection with later-described exemplified compounds, there are cited, for example, a phenylene group, a biphenylene group, a naphthylene group, an anthracenedyl group, a pyridinedyl group, a thiophenedyl group, and so on.

The above perfluoropolyether group has, in its structure, a perfluoropolyether main chain represented by, for example, —(O—$C_2F_4$)m-(O—$CF_2$)n- (m and n are each an integer of 1 or more), has a hydroxyl group (preferably at least two hydroxyl groups) at an end thereof, and further has at least one hydroxyl group on a side closer to a bond than the perfluoropolyether main chain. A group represented by, for example, the following formula (III) is preferably cited as such a perfluoropolyether group.

[Chemical Formula 14]

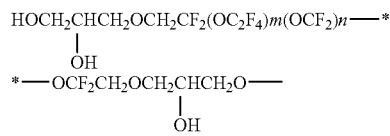

In the formula, m and n are each an integer of 1 or more.

The third embodiment of the magnetic-disk lubricant according to this invention has hydroxyl groups near both sides of the divalent aromatic group present at the center of a molecule in addition to hydroxyl groups at both ends of the molecule. Therefore, when the lubricant of this invention is coated on a protective layer, the lubricant interacts with the protective layer due to a π-electron cloud of the aromatic group present at the center of the lubricant molecule. Accordingly, the lubricant molecule adheres to the protective layer and, following this, the hydroxyl groups present on both sides of the aromatic group tend to be arranged on the surface of the protective layer. Therefore, in addition to the interaction between the hydroxyl groups at both ends of the lubricant molecule and the protective layer, proper interaction occurs between the hydroxyl groups on both sides of the aromatic group and the protective layer. As a result, the adhesion of a lubricating layer is improved due to the interaction between the hydroxyl groups of the lubricant and the protective layer conjointly with the interaction with the protective layer by the π electron cloud of the aromatic group present at the center of the lubricant molecule.

By the interactions described above, the magnetic-disk lubricant of this invention can form a lubricant layer (lubricating layer) in which lubricant molecules adequately have a folding structure on a protective layer. Therefore, even if the thickness of the lubricating layer is reduced, it is possible to form a uniform lubricating layer sufficiently covering the surface of a magnetic disk, thus obtaining the lubricating layer with high durability.

Therefore, the magnetic-disk lubricant of this invention makes it possible to achieve a further reduction in thickness of a lubricating layer required for reducing the magnetic spacing between a magnetic head and a recording layer of a magnetic disk, which is suitable for realizing a magnetic disk having high reliability (capable of ensuring stable operation) even with the low flying height of a magnetic head following the increase in recording density in recent years.

A fourth embodiment of a magnetic-disk lubricant according to this invention is a lubricant comprising a compound. In the compound, perfluoropolyether groups are bonded to each other through a divalent saturated cyclic hydrocarbon group. Each of the perfluoropolyether groups has a perfluoropolyether main chain in a structure thereof, and a hydroxyl group at an end thereof, and further has a hydroxyl group on a side closer to a bond than the perfluoropolyether main chain.

As the divalent saturated cyclic hydrocarbon group, as also cited in connection with later-described exemplified compounds, there are cited, for example, a cyclohexylene group, a cyclopropylene group, a cyclopentylene group, a cyclooctylene group, and so on.

The above perfluoropolyether group is the same as that of the third embodiment described above. The group represented by, for example, the above formula (III) is preferably cited as such a perfluoropolyether group.

The fourth embodiment of the magnetic-disk lubricant according to this invention has hydroxyl groups near both sides of the divalent saturated cyclic hydrocarbon group present at the center of a molecule in addition to hydroxyl groups at both ends of the molecule. Therefore, when the lubricant of this invention is coated on a protective layer, the saturated cyclic hydrocarbon group present at the center of the lubricant molecule interacts with the protective layer by the intermolecular force, i.e. the van der Waals force. Accordingly, the lubricant molecule adheres to the protective layer. Following this, the hydroxyl groups present on both sides of the saturated cyclic hydrocarbon group tend to be arranged on the surface of the protective layer. Therefore, in addition to the interaction between the hydroxyl groups at both ends of the lubricant molecule and the protective layer, proper interaction occurs between the hydroxyl groups on both sides of the saturated cyclic hydrocarbon group and the protective layer. As a result, the adhesion of a lubricating layer is improved due to the interaction between the hydroxyl groups of the lubricant and the protective layer conjointly with the interaction with the protective layer by the intermolecular force of the saturated cyclic hydrocarbon group present at the center of the lubricant molecule.

By the interactions described above, the magnetic-disk lubricant of this invention can form a lubricant layer (lubricating layer) in which lubricant molecules adequately have a folding structure on a protective layer. Therefore, even if the thickness of the lubricating layer is reduced, it is possible to form a uniform lubricating layer sufficiently covering the surface of a magnetic disk, thus obtaining the lubricating layer with high durability.

Therefore, the magnetic-disk lubricant of this invention makes it possible to achieve a further reduction in thickness of a lubricating layer required for reducing the magnetic spacing between a magnetic head and a recording layer of a magnetic disk, which is suitable for realizing a magnetic disk having high reliability (capable of ensuring stable operation) even with the low flying height of a magnetic head following the increase in recording density in recent years.

As a magnetic-disk lubricant production process according to the third embodiment, there is preferably cited, for example, a production process comprising reacting 2 equivalents of a perfluoropolyether compound having a perfluoropolyether main chain in a molecule and having hydroxyl groups at the ends thereof with 1 equivalent of an aromatic compound having structures each capable of reacting with the perfluoropolyether compound (e.g. an aromatic compound having two halogen groups or epoxide structures as substituents). Specifically, under a base condition, for example, with a base catalyst, perfluoropolyether compounds each having hydroxyl groups at the ends thereof are reacted with a base to obtain an alkoxide, then this alkoxide performs a nucleophilic substitution reaction with an aromatic compound having halogen groups (or this alkoxide performs a nucleophilic ring-opening reaction with an aromatic compound having epoxide structures), thereby obtaining a dimer compound in which the perfluoropolyether compounds are linked to each other through an aromatic group.

As a magnetic-disk lubricant production process according to the fourth embodiment, there is preferably cited, for example, a production process comprising reacting 2 equivalents of a perfluoropolyether compound having a perfluoropolyether main chain in a molecule and having hydroxyl groups at the ends thereof with 1 equivalent of a saturated cyclic hydrocarbon compound having structures each capable of reacting with the perfluoropolyether compound (e.g. a saturated cyclic hydrocarbon compound having two halogen groups as substituents, or the like). Specifically, under a base condition, for example, with a base catalyst, perfluoropolyether compounds each having hydroxyl groups at the ends thereof are reacted with a base to obtain an alkoxide, then this alkoxide performs a nucleophilic substitution reaction with, for example, a saturated cyclic hydrocarbon compound having halogen groups, thereby obtaining a dimer compound in which the perfluoropolyether compounds are linked to each other through a saturated cyclic hydrocarbon group.

As the above perfluoropolyether compound, there is preferably cited, for example, a perfluorotetraol compound having a total of four hydroxyl groups at the molecular ends thereof, represented by the following formula (IV).

[Chemical Formula 15]

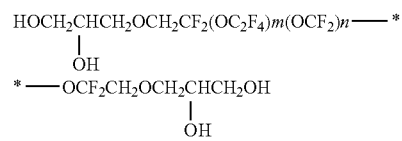

In the formula, m and n are each an integer of 1 or more.

According to each of the magnetic-disk lubricant production processes described above, it is possible to suitably obtain a magnetic-disk lubricant of this invention in which hydroxyl groups are introduced near both sides of an aromatic group or a saturated cyclic hydrocarbon group, i.e. around the center of a molecule, in addition to hydroxyl groups at both ends of the molecule by linking perfluoropolyether compounds each having hydroxyl groups only at the molecular ends thereof to dimerize them. For example, when the perfluorotetraol compound represented by the above formula (IV) is used as the above perfluoropolyether compound, there is obtained a lubricant compound having two hydroxyl groups at each molecular end (four in total) and one hydroxyl group near each of both sides of the aromatic group or the saturated cyclic hydrocarbon group.

Exemplified compounds of magnetic-disk lubricants of this invention are cited below, but this invention is not limited thereto.

[Chemical Formula 16]

Exemplified Compound

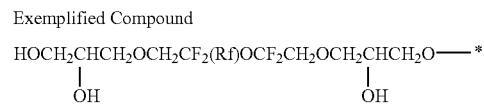

-continued

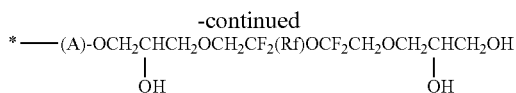

Rf: —(OC$_2$F$_4$)m(OCF$_2$)n- (m, n=an integer of 1 or more)

Herein, A is a phenylene group, a biphenylene group, a naphthylene group, an anthracenedyl group, a pyridinedyl group, a thiophenedyl group, a cyclohexylene group, a cyclopropylene group, a cyclopentylene group, or a cyclooctylene group.

This invention further provides a magnetic disk having at least a magnetic layer, a protective layer, and a lubricating layer over a substrate. That is, this invention is a magnetic disk having a magnetic layer, a protective layer, and a lubricating layer over a substrate, wherein the lubricating layer is formed using the magnetic-disk lubricant of this invention.

According to the magnetic disk of this invention, since the lubricating layer containing the magnetic-disk lubricant of this invention is used on the surface of the magnetic disk, it is possible to obtain the high-coverage lubricating layer capable of, even with a reduced thickness, sufficiently covering the surface of the protective layer and excellent in heat resistance and adhesion to the protective layer. Therefore, it is possible to achieve a further reduction in thickness of a lubricating layer required for reducing the magnetic spacing, so that it is possible to provide a magnetic disk having high reliability (capable of ensuring stable operation) even with the low flying height of a magnetic head following the increase in recording density in recent years and with very strict environmental resistance following the diversification of applications.

When forming the lubricating layer using the magnetic-disk lubricant of this invention, it can be formed by using a solution in which the lubricant is dispersed and dissolved in an appropriate solvent and coating the solution, for example, by a dipping method. As the solvent, use can be preferably made, for example, of a fluorine-based solvent (trade name Vertrel XF or the like manufactured by DuPont-Mitsui Fluorochemicals Co., Ltd.). A film forming method for the lubricating layer is, of course, not limited to the above dipping method and use may be made of a film forming method such as a spin coating method, a spray method, or a vapor coating method.

In this invention, for further improving the adhesion of the formed lubricating layer to the protective layer, the magnetic disk may be exposed to an atmosphere at 70° C. to 200° C. after the film formation.

In this invention, the thickness of the lubricating layer is preferably set to 4 Å to 18 Å. If it is less than 4 Å, there is a case where the lubricating performance as the lubricating layer is lowered. If it exceeds 18 Å, it is not preferable in terms of a reduction in film thickness, there is a case where the fly stiction failure occurs, and there is a case where the LUL durability is lowered.

As the protective layer in this invention, a carbon-based protective layer can be preferably used. Particularly, an amorphous carbon protective layer is preferable. With the protective layer being particularly the carbon-based protective layer, the interaction between the hydroxyl groups of the magnetic-disk lubricant of this invention and the protective layer is further enhanced so that the operation and effect according to this invention are further exhibited, which is thus preferable. The adhesion between the carbon-based protective layer and the lubricating layer can be controlled by forming the carbon-based protective layer of hydrogenated carbon and/or carbon nitride and adjusting the content of hydrogen and/or nitrogen. In this case, the content of hydrogen is preferably set to 3 to 20 at % when measured by hydrogen forward scattering (HFS). The content of nitrogen is preferably set to 4 to 12 at % when measured by X-ray photoelectron spectroscopy (XPS).

When using the carbon-based protective layer in this invention, it can be formed, for example, by a DC magnetron sputtering method. Alternatively, it is preferably an amorphous carbon protective layer formed by a plasma CVD method. Being formed by the plasma CVD method, the surface of the protective layer becomes uniform and dense. Therefore, it is preferable that the lubricating layer by this invention be formed on the protective layer with smaller roughness formed by the CVD method. Particularly, it is preferably an amorphous hydrogenated carbon protective layer formed by the plasma CVD method.

In this invention, the substrate is preferably a glass substrate. The glass substrate is rigid and excellent in smoothness and thus is suitable for an increase in recording density. As the glass substrate, an aluminosilicate glass substrate, for example, is cited and, particularly, a chemically strengthened aluminosilicate glass substrate is preferable.

In this invention, the main surface of the substrate is preferably ultra-smooth with Rmax of 6 nm or less and Ra of 0.6 nm or less. Rmax and Ra herein referred to are based on the JIS B0601 standard.

The magnetic disk of this invention has at least the magnetic layer, the protective layer, and the lubricating layer over the substrate. In this invention, the magnetic layer is not particularly limited and may be a magnetic layer for the in-plane recording system or a magnetic layer for the perpendicular recording system. Particularly, if it is a CoPt-based magnetic layer, high coercive force and high reproduction output can be achieved, which is thus preferable.

In the magnetic disk of this invention, an underlayer may be provided between the substrate and the magnetic layer if necessary. Further, an adhesive layer, a soft magnetic layer, and so on may be provided between the underlayer and the substrate. In this case, as the underlayer, for example, a Cr layer, a Ta layer, a Ru layer, a CrMo, CoW, CrW, CrV, or CrTi alloy layer, or the like is cited and, as the adhesive layer, for example, a CrTi, NiAl, or AlRu alloy layer or the like is cited. Further, as the soft magnetic layer, for example, a CoZrTa alloy film or the like is cited.

The magnetic disk of this invention is particularly suitable as a magnetic disk adapted to be mounted in a magnetic disk apparatus of the load unload system.

EXAMPLES

Hereinbelow, this invention will be described in further detail based on Examples.

Example 1

Figure 1:
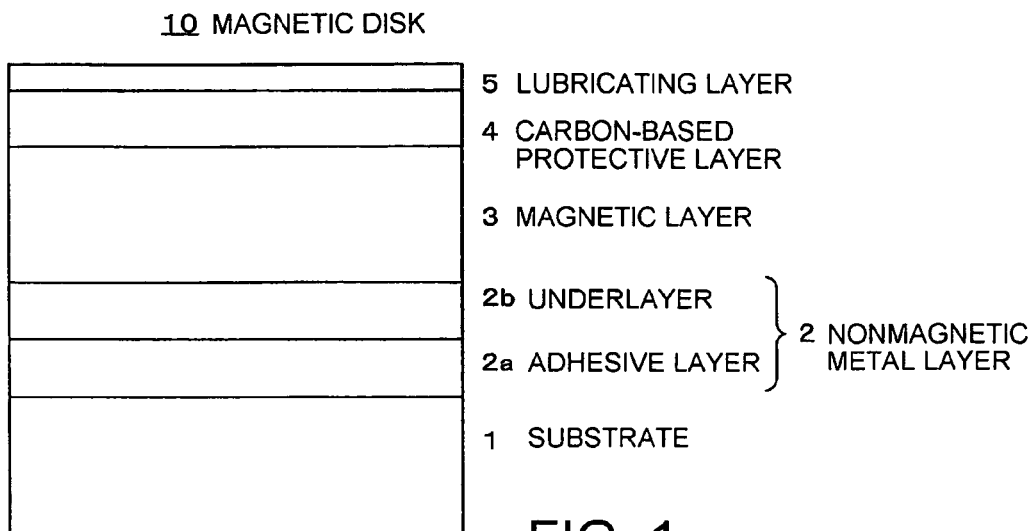
FIG. 1 is an exemplary sectional view of an Example of a magnetic disk of this invention.

FIG. 1 shows a magnetic disk 10 according to one Example of this invention.

The magnetic disk 10 is fabricated by forming a nonmagnetic metal layer 2 composed of an adhesive layer 2a and an underlayer 2b, a magnetic layer 3, a carbon-based protective layer 4, and a lubricating layer 5 in this order on a substrate 1.

(Production of Magnetic-Disk Lubricant of First Embodiment)

The lubricant compound exemplified above was produced by reacting 2 equivalents of the perfluorodiol compound represented by the above formula (II) with 1 equivalent of the diepoxy compound exemplified above under a base condition. Specifically, both compounds were agitated in acetone and then refluxed, with sodium hydroxide added thereto. The conditions such as reaction temperature and time were suitably set.

A lubricant comprising the compound thus obtained was properly subjected to molecular weight fractionation, for example, by the supercritical fluid extraction method.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 4.8 nm and Ra of 0.43 nm.

On the disk substrate 1, the adhesive layer 2a, the underlayer 2b, and the magnetic layer 3 were formed in this order in an Ar gas atmosphere by the DC magnetron sputtering method.

As the adhesive layer 2a, an NiAL alloy film (Ni:50 at %, Al:50 at %) was formed to a thickness of 300 Å.

As the underlayer 2b, a CrMo alloy film (Cr:80 at %, Mo:20 at %) was formed to a thickness of 80 Å.

As the magnetic layer 3, a CoCrPtB alloy film (Co:62 at %, Cr:20 at %, Pt:12 at %, B:6 at %) was formed to a thickness of 150 Å.

Subsequently, sputtering was carried out using a carbon target in an atmosphere of a mixed gas of an Ar gas and a hydrogen gas (hydrogen gas content 30%) by the DC magnetron sputtering method, thereby forming the protective layer 4 of hydrogenated carbon to a thickness of 25 Å.

Then, the lubricating layer 5 was formed in the following manner.

There was prepared a solution in which the lubricant (Mn measured by the NMR method was 4000 and the molecular weight dispersion was 1.25) comprising the compound (the above exemplified compound) of this invention produced as described above and subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer 4 was immersed therein and coated therewith by the dipping method, thereby forming the lubricating layer 5.

After the film formation, the magnetic disk was heat-treated in a vacuum furnace at 130° C. for 90 minutes. The thickness of the lubricating layer 5 was measured by a Fourier transform infrared spectrophotometer (FTIR) and it was 12 Å. In this manner, the magnetic disk 10 of Example 1 was obtained.

Then, evaluations of the magnetic disk of this Example 1 were performed according to the following test methods.

(Evaluation of Magnetic Disk)

(1) First, a lubricating layer adhesion test was performed for evaluating the bonding performance (adhesion) of the lubricating layer with respect to the protective layer.

First, the thickness of the lubricating layer of the magnetic disk of this Example was measured by the FTIR (Fourier transform infrared spectrophotometer) method and it was 12 Å as described above. Then, the magnetic disk of this Example was immersed in the fluorine-based solvent Vertrel XF for 1 minute. By the immersion in the solvent, portions of the lubricating layer with poor adhesion are dispersed and dissolved in the solvent, but portions with strong adhesion can remain on the protective layer. Then, the magnetic disk was removed from the solvent and the thickness of the lubricating layer was measured again by the FTIR method. The ratio of the thickness of the lubricating layer after the immersion in the solvent to the thickness of the lubricating layer before the immersion in the solvent is called a lubricating layer adhesion ratio (bonded ratio). It can be the that the higher the bonded ratio, the higher the bonding performance of the lubricating layer with respect to the protective layer. With the magnetic disk of this Example, the bonded ratio was 90%. Since the bonded ratio is judged to be preferable if it is 70% or more, it is seen that the magnetic disk of this Example is extremely excellent in bonding performance of the lubricating layer.

The thickness of the lubricating layer was determined by deriving a correlation using two methods, i.e. the FTIR method and an ellipsometry method, and using this correlation. That is, the main chain of this lubricant is mainly formed by C and F and, since the density of C—F in one molecule differs depending on the kind of lubricant, there is a possibility that even if the FTIR peak height is the same, the actual thickness is different. In view of this, disks having thicknesses of 8 to 20 Å (per 2 Å) were prepared and an increase in thickness from the surface of each disk with no lubricant was derived using an ellipsometer. With respect to these disks, the peak heights in C—F stretching vibration were measured using the FTIR, thereby deriving a correlation equation based on the obtained peak values and the ellipsometer values. Using this correlation equation, the thickness of the lubricating layer can be easily derived by the FTIR measurement.

(2) Then, a lubricating layer coverage evaluation was performed.

The lubricating layer coverage was measured by the X-ray photoelectron spectroscopy known from U.S. Pat. No. 6,099,981. As the lubricating layer coverage increases, it represents that the surface of the magnetic disk is coated with the lubricating layer more uniformly, and thus it is possible to suppress the head crash failure and the corrosion failure. With the magnetic disk of this Example 1, the lubricating layer coverage was as high as 90%. When a lubricating layer is formed by the dipping method using a conventional perfluoropolyether-based lubricant, the lubricating layer coverage is judged to be by and large preferable if it is 70% or more, and therefore, it is seen that the magnetic disk of this Example 1 has the uniform lubricating layer with a small thickness and yet with an extremely high lubricating layer coverage.

(3) Then, an LUL (Load Unload) durability test was performed for evaluating the LUL durability of the magnetic disk of this Example 1.

An LUL-system HDD (Hard Disk Drive) (5400 rpm rotation type) was prepared and a magnetic head with a flying height of 10 nm and the magnetic disk of this Example 1 were mounted therein. A slider of the magnetic head is an NPAB (negative pressure) slider and is mounted with a magnetoresistive effect element (GMR element) as a reproducing element. A shield portion is made of an FeNi-based permalloy alloy. By causing the LUL-system HDD to continuously repeat the LUL operations, the number of LUL times endured by the magnetic disk up to the occurrence of failure was measured.

As a result, the magnetic disk of this Example 1 endured the LUL operations of 900,000 times with no failure at a very low flying height of 10 nm. In a normal HDD using environment, use for about 10 years is generally required for the number of LUL times to exceed 400,000 times. Since a magnetic disk is currently judged to be preferable if it endures 600,000 times or more, it can be the that the magnetic disk of this Example 1 has extremely high reliability.

The surface of the magnetic disk after the LUL durability test was observed in detail using an optical microscope and an electron microscope and was found to be excellent, i.e. no abnormality such as damage or dirt was observed. Further, the surface of the magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

(4) Then, a fly stiction test was performed. 100 magnetic disks of this Example 1 were manufactured and, by performing a glide test using a glide head with a flying height of 5 nm, the test was performed to see whether or not the fly stiction phenomenon occurred. When the fly stiction phenomenon occurs, the flying posture of the glide head suddenly becomes abnormal and, therefore, by monitoring a signal of a piezoelectric element bonded to the glide head, the occurrence of fly stiction can be detected. As a result, with the magnetic disks of this Example 1, the fly stiction phenomenon did not occur and the pass rate of the test was 100%.

For evaluating the thermal properties, the LUL durability test and the fly stiction test were performed in atmospheres of −20° C. to 50° C. With the magnetic disks of this Example, no particular failure occurred and the good results were obtained.

Comparative Example 1

As a lubricant, use was made of a conventional perfluoropolyether-based lubricant, Fomblin Z-DOL (trade name) manufactured by Solvay Solexis, Inc., having been subjected to molecular weight fractionation by the GPC method to have Mw of 3000 and a molecular weight dispersion of 1.08. Then, a solution in which this lubricant was dispersed and dissolved in a fluorine-based solvent, Vertrel XF (trade name) manufactured by DuPont-Mitsui Fluorochemicals Co., Ltd., was used as a coating solution and a magnetic disk formed with layers up to a protective layer was immersed therein and coated therewith by the dipping method, thereby forming a lubricating layer. Herein, the concentration of the coating solution was properly adjusted so that the lubricating layer was formed to a thickness in the range of 10 to 12 Å. A magnetic disk manufactured in the same manner as in Example 1 except the above was used for a Comparative Example.

A bonding performance evaluation of the lubricating layer of the magnetic disk of this Comparative Example was performed in the same manner as in Example 1, wherein the bonded ratio was 62%, a very low value. Further, a lubricating layer coverage evaluation was performed, wherein the lubricating layer coverage was 80%, a very low value as compared with the magnetic disk of the Example. That is, when the lubricating layer is formed by the dipping method using the conventional perfluoropolyether-based lubricant, if the thickness thereof is set to about 10 to 12 Å, the lubricating layer coverage is largely reduced and it is difficult to form a uniform lubricating layer with a high lubricating layer coverage as that in the above Example.

Further, an LUL durability test was performed, wherein the magnetic disk of this Comparative Example failed when the number of LUL times reached 500,000 times. After the test, a magnetic head and the magnetic disk were removed and examined. Then, transfer of the lubricant and corrosion failure were confirmed at an NPAB pocket portion and an ABS surface of the magnetic head and adhesion of dirt was confirmed on the surface of the magnetic disk. Further, among tested HDDs, the fly stiction failure occurred in 70% HDDs (pass rate 30%).

For evaluating the thermal properties, the LUL durability test and the fly stiction test were performed in atmospheres of −20° C. to 50° C. Then, failure occurred in the magnetic disks of this Comparative Example and the degree of failure was large depending on the temperature of the atmosphere.

Example 2

FIG. 1 shows a magnetic disk 10 according to one Example of this invention.

The magnetic disk 10 is fabricated by forming a nonmagnetic metal layer 2 composed of an adhesive layer 2a and an underlayer 2b, a magnetic layer 3, a carbon-based protective layer 4, and a lubricating layer 5 in this order on a substrate 1.

(Production of Magnetic-Disk Lubricant of Second Embodiment)

The exemplified compounds Nos. 1 to 5 described above were each produced by reacting 2 equivalents of the perfluorotetraol compound represented by the above formula (IV) with 1 equivalent of each of aliphatic compounds represented by $Cl(CH_2)pCl$ (p=3, 8, 13, 18, 23; five kinds) under a base condition. The reaction conditions were suitably set.

Lubricants comprising the compounds thus obtained, respectively, were properly subjected to molecular weight fractionation, for example, by the supercritical fluid extraction method.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 4.8 nm and Ra of 0.43 nm.

On the disk substrate 1, the adhesive layer 2a, the underlayer 2b, and the magnetic layer 3 were formed in this order in an Ar gas atmosphere by the DC magnetron sputtering method.

As the adhesive layer 2a, an NiAl alloy film (Ni:50 at %, Al:50 at %) was formed to a thickness of 300 Å.

As the underlayer 2b, a CrMo alloy film (Cr:80 at %, Mo:20 at %) was formed to a thickness of 80 Å.

As the magnetic layer 3, a CoCrPtB alloy film (Co:62 at %, Cr:20 at %, Pt:12 at %, B:6 at %) was formed to a thickness of 150 Å.

Subsequently, sputtering was carried out using a carbon target in an atmosphere of a mixed gas of an Ar gas and a hydrogen gas (hydrogen gas content 30%) by the DC magnetron sputtering method, thereby forming the protective layer 4 of hydrogenated carbon to a thickness of 25 Å.

Then, the lubricating layer 5 was formed in the following manner.

There was prepared a solution in which the lubricant (Mn measured by the NMR method was 2500 and the molecular weight dispersion was 1.25) comprising the compound (the above exemplified compound No. 1) of this invention having been subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.3 wt %. Using this solution as a coating solution, a magnetic disk formed with the layers up to the protective layer 4 was immersed therein and coated therewith by the dipping method, thereby forming the lubricating layer 5.

After the film formation, the magnetic disk was heat-treated in a vacuum furnace at 130° C. for 90 minutes. The thickness of the lubricating layer 5 was measured by a Fourier transform infrared spectrophotometer (FTIR) and it was 5 Å. In this manner, the magnetic disk 10 of Example 2 was obtained.

Coating solutions were prepared in the same manner as described above, using the lubricants comprising the above exemplified compounds Nos. 2 to 5, respectively, and lubricating layers were formed. Then, the following lubricating layer thicknesses were obtained. That is, the thickness of a lubricating layer to be formed can be adjusted by a difference in length (the number of carbons in the main chain, i.e. the value of p) of an aliphatic group in a compound.

TABLE 1

| Exemplified Compound No. | Lubricating Layer Thickness (Å) |
|---|---|
| 1 (p = 3) | 5 |
| 2 (p = 8) | 8 |
| 3 (p = 13) | 10 |
| 4 (p = 18) | 13 |
| 5 (p = 23) | 13 |

Then, evaluations of the magnetic disk of this Example 2 were performed according to the following test methods.

(Evaluation of Magnetic Disk)

First, a lubricating layer coverage evaluation was performed in the same manner as in Example 1.

As a result, with the magnetic disk of this Example 2, the lubricating layer coverage was as high as 98%. When a lubricating layer is formed by the dipping method using a conventional perfluoropolyether-based lubricant, the lubricating layer coverage is judged to be by and large preferable if it is 70% or more, and therefore, it is seen that the magnetic disk of this Example 2 has the uniform lubricating layer with a small thickness and yet with an extremely high lubricating layer coverage.

Then, the same LUL (Load Unload) durability test as that in Example 1 was performed for evaluating the LUL durability of the magnetic disk of this Example 2.

As a result, the magnetic disk of this Example 2 endured the LUL operations of 900,000 times with no failure at a very low flying height of 10 nm. In a normal HDD using environment, use for about 10 years is generally required for the number of LUL times to exceed 400,000 times. Since a magnetic disk is judged to be preferable if it endures particularly 600,000 times or more, it can be that the magnetic disk of this Example 2 has extremely high reliability.

The surface of the magnetic disk after the LUL durability test was observed in detail using an optical microscope and an electron microscope and was found to be excellent, i.e. no abnormality such as damage or dirt was observed. Further, the surface of a magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

Then, the same fly stiction test as that in Example 1 was performed. 100 magnetic disks of this Example 2 were manufactured. As a result of the test, with the magnetic disks of this Example 2, the fly stiction phenomenon did not occur and the pass rate of the test was 100%.

Examples 3 and 4

A magnetic disk of Example 3 was manufactured in the same manner as in Example 2 except that a lubricating layer was formed to a thickness of 8 Å using the exemplified compound No. 2 (Mn was 2600 and the molecular weight dispersion was 1.2) of this invention as a lubricant of the second embodiment. Further, a magnetic disk of Example 4 was manufactured in the same manner as in Example 2 except that a lubricating layer was formed to a thickness of 10 Å using the exemplified compound No. 3 (Mn was 2700 and the molecular weight dispersion was 1.15) of this invention as a lubricant. In each of the magnetic disks of Examples 3 and 4, the lubricating layer coverage was as high as 90%. That is, it is seen that, also in each of the magnetic disks of Examples 3 and 4, there is formed the uniform lubricating layer with a small thickness and yet with an extremely high lubricating layer coverage.

The magnetic disks of Examples 3 and 4 were evaluated in the same manner as in Example 2. In each of Examples 3 and 4, the magnetic disk endured the LUL operations of 900,000 times with no failure at a very low flying height of 10 nm. The surfaces of these magnetic disks and the surfaces of magnetic heads after the LUL durability test were observed in detail using an optical microscope and an electron microscope and were found to be excellent, i.e. no abnormality such as damage or dirt was observed and, further, no lubricant adhesion to the magnetic heads or no corrosion failure was observed.

Further, a fly stiction test was performed. In each of Examples 3 and 4, the fly stiction phenomenon did not occur and the pass rate of the test was 100%.

Comparative Example 2

As a lubricant, use was made of a conventional perfluoropolyether-based lubricant, Fomblin Z-DOL (trade name) manufactured by Solvay Solexis, Inc., having been subjected to molecular weight fractionation by the GPC method to have Mw of 3000 and a molecular weight dispersion of 1.08. Then, a solution in which this lubricant was dispersed and dissolved in a fluorine-based solvent, Vertrel XF (trade name) manufactured by DuPont-Mitsui Fluorochemicals Co., Ltd., was used as a coating solution and a magnetic disk formed with layers up to a protective layer was immersed therein and coated therewith by the dipping method, thereby forming a lubricating layer. Herein, the concentration of the coating solution was properly adjusted so that the lubricating layer was formed to a thickness in the range of 5 to 10 Å. A magnetic disk manufactured in the same manner as in Example 1 except the above was used for a Comparative Example.

A coverage evaluation of the lubricating layer of the magnetic disk of this Comparative Example was performed in the same manner as in Example 2, wherein the lubricating layer coverage was 70%, a very low value as compared with the magnetic disks of Examples 2 to 4. That is, when the lubricating layer is formed by the dipping method using the conventional perfluoropolyether-based lubricant, if the thickness thereof is set to about 5 to 10 Å, the lubricating layer coverage is largely reduced and it is difficult to form a uniform lubricating layer with a high lubricating layer coverage as that in each of the above Examples.

Further, an LUL durability test was performed, wherein the magnetic disk of this Comparative Example failed when the number of LUL times reached 500,000 times. After the test, a magnetic head and the magnetic disk were removed and examined. Then, transfer of the lubricant and corrosion failure were confirmed at an NPAB pocket portion and an ABS surface of the magnetic head and adhesion of dirt was confirmed on the surface of the magnetic disk. Further, among tested HDDs, the fly stiction failure occurred in 70% HDDs (pass rate 30%).

Example 5

FIG. 1 shows a magnetic disk 10 according to one Example of this invention.

The magnetic disk 10 is fabricated by forming a nonmagnetic metal layer 2 composed of an adhesive layer 2a and an underlayer 2b, a magnetic layer 3, a carbon-based protective layer 4, and a lubricating layer 5 in this order on a substrate 1.

(Production of Magnetic-Disk Lubricant of Third Embodiment)

A lubricant (a compound in which A in the above exemplified compound is a phenylene group) of this invention was produced by reacting 2 equivalents of the perfluorotetraol compound represented by the above formula (IV) with 1 equivalent of 1,4-dichlorobenzene under a base condition. The reaction conditions were suitably set.

The lubricant thus obtained was properly subjected to molecular weight fractionation, for example, by the supercritical fluid extraction method.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 4.8 nm and Ra of 0.43 nm.

On the disk substrate 1, the adhesive layer 2a, the underlayer 2b, and the magnetic layer 3 were formed in this order in an Ar gas atmosphere by the DC magnetron sputtering method.

As the adhesive layer 2a, an NiAl alloy film (Ni:50 at %, Al:50 at %) was formed to a thickness of 300 Å.

As the underlayer 2b, a CrMo alloy film (Cr:80 at %, Mo:20 at %) was formed to a thickness of 80 Å.

As the magnetic layer 3, a CoCrPtB alloy film (Co:62 at %, Cr:20 at %, Pt:12 at %, B:6 at %) was formed to a thickness of 150 Å.

Subsequently, sputtering was carried out using a carbon target in an atmosphere of a mixed gas of an Ar gas and a hydrogen gas (hydrogen gas content 30%) by the DC magnetron sputtering method, thereby forming the protective layer 4 of hydrogenated carbon to a thickness of 25 Å.

Then, the lubricating layer 5 was formed in the following manner.

There was prepared a solution in which the above lubricant (Mn measured by the NMR method was 2800 and the molecular weight dispersion was 1.25) of this invention having been subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer 4 was immersed therein and coated therewith by the dipping method, thereby forming the lubricating layer 5.

After the film formation, the magnetic disk was heat-treated in a vacuum furnace at 130° C. for 90 minutes. The thickness of the lubricating layer 5 was measured by a Fourier transform infrared spectrophotometer (FTIR) and it was 5 Å. In this manner, the magnetic disk 10 of Example 5 was obtained.

Then, evaluations of the magnetic disk of this Example 5 were performed according to the following test methods.

(Evaluation of Magnetic Disk)

First, the same lubricating layer coverage evaluation as that in Example 1 was performed. With the magnetic disk of this Example 5, the lubricating layer coverage was as high as 98%. When a lubricating layer is formed by the dipping method using a conventional perfluoropolyether-based lubricant, the lubricating layer coverage is judged to be by and large preferable if it is 70% or more, and therefore, it is seen that the magnetic disk of this Example 1 has the uniform lubricating layer with a small thickness and yet with a high lubricating layer coverage.

Then, the same lubricating layer adhesion test as that in Example 1 was performed for evaluating the bonding performance (adhesion) of the lubricating layer with respect to the protective layer. With the magnetic disk of this Example, the bonded ratio was 92%. Since, conventionally, the bonded ratio is judged to be by and large preferable if it is 70% or more, it is seen that the magnetic disk of this Example is extremely excellent in adhesion of the lubricating layer even with a reduced thickness.

Then, the same LUL (Load Unload) durability test as that in Example 1 was performed for evaluating the LUL durability of the magnetic disk of this Example 5.

As a result, the magnetic disk of this Example 5 endured the LUL operations of 900,000 times with no failure at a very low flying height of 10 nm. In a normal HDD using environment, use for about 10 years is generally required for the number of LUL times to exceed 400,000 times. Since a magnetic disk is judged to be preferable if it endures particularly 600,000 times or more, it can be that the magnetic disk of this Example 5 has extremely high reliability.

The surface of the magnetic disk after the LUL durability test was observed in detail using an optical microscope and an electron microscope and was found to be excellent, i.e. no abnormality such as damage or dirt was observed. Further, the surface of a magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

Then, the same fly stiction test as that in Example 1 was performed. 100 magnetic disks of this Example 5 were manufactured. As a result of the test, with the magnetic disks of this Example 5, the fly stiction phenomenon did not occur and the pass rate of the test was 100%.

Example 6

A lubricant (a compound in which A in the above exemplified compound is a cyclohexylene group) of the fourth embodiment of this invention was produced by reacting 2 equivalents of the perfluorotetraol compound represented by the above formula (IV) with 1 equivalent of 1,4-dichlorocyclohexane under a base condition. The reaction conditions were suitably set.

The lubricant thus obtained was properly subjected to molecular weight fractionation, for example, by the supercritical fluid extraction method.

A magnetic disk of Example 6 was manufactured in the same manner as in Example 5 except that a lubricating layer was formed to a thickness of 8 Å using the above lubricant (Mn was 2850 and the molecular weight dispersion was 1.21).

The magnetic disk of Example 6 was evaluated in the same manner as in Example 5. With the magnetic disk of this Example, the lubricating layer coverage was as high as 93%. That is, it is seen that there is formed the uniform lubricating layer with a small thickness and yet with a high lubricating layer coverage. Further, with the magnetic disk of this Example, the bonded ratio was 98%. That is, it is seen that the magnetic disk of this Example is extremely excellent in adhesion of the lubricating layer even with a reduced thickness.

Further, an LUL durability test was performed, wherein the magnetic disk endured the LUL operations of 900,000 times with no failure at a very low flying height of 10 nm. The surface of the magnetic disk and the surface of a magnetic head after the LUL durability test were observed in detail using an optical microscope and an electron microscope and were found to be excellent, i.e. no abnormality such as damage or dirt was observed and, further, no lubricant adhesion to the magnetic head or no corrosion failure was observed. Further, a fly stiction test was performed, wherein the fly stiction phenomenon did not occur and the pass rate of the test was 100%.

Comparative Example 3

As a lubricant, use was made of a conventional perfluoropolyether-based lubricant, Fomblin Z-DOL (trade name) manufactured by Solvay Solexis, Inc., having been subjected to molecular weight fractionation by the GPC method to have Mw of 3000 and a molecular weight dispersion of 1.08. Then, a solution in which this lubricant was dispersed and dissolved in a fluorine-based solvent, Vertrel XF (trade name) manufactured by DuPont-Mitsui Fluorochemicals Co., Ltd., was used as a coating solution and a magnetic disk formed with layers up to a protective layer was immersed therein and coated therewith by the dipping method, thereby forming a lubricating layer. Herein, the concentration of the coating solution was properly adjusted so that the lubricating layer was formed to a thickness in the range of 5 to 10 Å. A magnetic disk manufactured in the same manner as in Example 5 except the above was used for a Comparative Example.

A coverage evaluation of the lubricating layer of the magnetic disk of this Comparative Example was performed in the same manner as in Example 5, wherein the lubricating layer coverage was 70%, a very low value as compared with the magnetic disks of Examples 5 and 6. When the lubricating layer is formed by the dipping method using the conventional perfluoropolyether-based lubricant, if the thickness thereof is set to about 5 to 10 Å, the lubricating layer coverage is largely reduced and it is difficult to form a uniform lubricating layer with a high lubricating layer coverage as that in each of the above Examples. Further, an adhesion evaluation of the lubricating layer of the magnetic disk of this Comparative Example was performed, wherein the bonded ratio was 20%, a very low value as compared with Examples 5 and 6.

Further, an LUL durability test was performed, wherein the magnetic disk of this Comparative Example failed when the number of LUL times reached 500,000 times. After the test, a magnetic head and the magnetic disk were removed and examined. Then, transfer of the lubricant and corrosion failure were confirmed at an NPAB pocket portion and an ABS surface of the magnetic head and adhesion of dirt was confirmed on the surface of the magnetic disk. Further, among tested HDDs, the fly stiction failure occurred in 70% HDDs (pass rate 30%).

Example 7

Production of Magnetic-Disk Lubricant of First Embodiment

The lubricant compound exemplified above was produced by reacting 2 equivalents of the perfluorodiol compound represented by the above formula (II) with 1 equivalent of the diepoxy compound exemplified above under a base condition. In this event, by suitably changing the monomer charging amount and the reaction conditions, there were obtained eight kinds of lubricant compounds Nos. 1 to 8 having different molecular weights. Mn (measured by the NMR method) and EW (derived by the method described above) of the respective compounds are as follows.

No. 1 Mn:1500, EW:300
No. 2 Mn:2500, EW:500
No. 3 Mn:3000, EW:600
No. 4 Mn:4000, EW:800 (used in Example 1)
No. 5 Mn:4340, EW:903
No. 6 Mn:4500, EW:910
No. 7 Mn:5500, EW:1150
No. 8 Mn:6000, EW:1260

With respect to the above eight kinds of compounds, the relationship between Mn and EW is plotted in FIG. 2 described above. All the compounds are within the predetermined range (the range surrounded by segments a to d in FIG. 2) representing the relationship between Mn and EW defined by this invention.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as a disk substrate. The main surface of the disk substrate was mirror-polished to Rmax of 4.8 nm and Ra of 0.43 nm.

Then, using a single-wafer sputtering apparatus, an adhesive layer, a soft magnetic layer, a first underlayer, a second underlayer, and a magnetic layer, described below, were formed in this order on the obtained magnetic-disk glass substrate. Then, a carbon-based protective layer was formed by the plasma CVD method and a lubricating layer was further formed thereon by the dipping method. This magnetic disk is a magnetic disk for the perpendicular magnetic recording system.

As the adhesive layer, a Ti-based alloy thin film was formed to a thickness of 100 Å.

As the soft magnetic layer, a Co-based alloy thin film was formed to a thickness of 600 Å.

As the first underlayer, a Pt-based alloy thin film was formed to a thickness of 70 Å. Further, as the second underlayer, a Ru-based alloy thin film was formed to a thickness of 400 Å.

The magnetic layer was made of a CoPtCr alloy and formed to a thickness of 200 Å.

The protective layer was a diamond-like carbon protective layer and was formed by the plasma CVD method. The protective layer was formed to a thickness of 50 Å on the main surface.

Then, the lubricating layer was formed in the following manner.

There was prepared a solution in which a lubricant comprising the compound (the above compound No. 5) of this invention produced as described above and subjected to molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer was immersed therein and coated therewith by the dipping method, thereby forming the lubricating layer.

After the film formation, the magnetic disk was heat-treated in a vacuum furnace at 130° C. for 90 minutes. The thickness of the lubricating layer was measured by a Fourier transform infrared spectrophotometer (FTIR) and it was 12 Å. In this manner, the magnetic disk of Example 7 was obtained.

Then, evaluations of the magnetic disk and the lubricant of this Example 7 were performed according to the following test methods.

(Lubricant (Bulk) Heat Resistance Test and Alumina Resistance Test)

The weight reduction ratio at 300° C. was measured using a thermal analysis apparatus while heating the above lubricant compound No. 5 used in this Example from 40° C. to 500° C. The weight reduction ratio was 4%, i.e. very small, and thus it was seen that the compound was excellent in heat resistance.

Further, the above lubricant compound was added with 20% alumina ($Al_2O_3$) and maintained at a constant temperature of 200° C. for 500 minutes and then the alumina resistance was evaluated. The reduction ratio was 6%, i.e. very small, and thus it was seen that the compound was excellent in alumina resistance.

(Evaluation of Magnetic Disk)

A bonding performance evaluation of the lubricating layer of the magnetic disk of this Example 7 was performed in the same manner as in Example 1, wherein the bonded ratio was 85%. Further, a lubricating layer coverage evaluation was performed, wherein the lubricating layer coverage was 97%, a very high value. That is, it is possible to form a uniform lubricating layer with a high lubricating layer coverage.

Further, the same LUL durability test as that in Example 1 was performed, wherein the magnetic disk of this Example 7 endured the LUL operations of 900,000 times with no failure at a very low flying height of 10 nm. The surface of the magnetic disk and the surface of a magnetic head after the LUL durability test were observed in detail using an optical microscope and an electron microscope and were found to be excellent, i.e. no abnormality such as damage or dirt was observed and, further, no lubricant adhesion to the magnetic head or no corrosion failure was observed. Further, the same fly stiction test as that in Example 1 was performed, wherein the fly stiction phenomenon did not occur and the pass rate of the test was 100%.

Further, a pin-on evaluation test was performed by applying a load of 30 gf to the surface of the magnetic disk at a position of disk radius 20 mm, rotating the disk at a rotation speed of 120 rpm, and performing a measurement until a film on the disk surface was broken. With the magnetic disk of this Example 7, it was 700 (pass count) and thus it was seen that this magnetic disk was excellent in physical durability even if the thickness of the lubricating layer was reduced.

For evaluating the thermal properties, the LUL durability test and the fly stiction test were performed in atmospheres of −20° C. to 50° C. With the magnetic disks of this Example 7, no particular failure occurred and the good results were obtained. The above lubricant used in this Example has a viscosity in the range of 5000 to 12000 mPa·s particularly at −10° C. and thus has excellent flow properties even at such a low temperature, and therefore, it has high reliability even if used in a low temperature environment.

The evaluation results for this Example are collectively shown in later-described Table 1.

Example 8

A magnetic disk manufactured in the same manner as in Example 7 except that use was made, as a lubricant, of a lubricant comprising a compound (the exemplified lubricant compound No. 1 of the second embodiment described above) of this invention having been subjected to molecular weight fractionation by the supercritical fluid extraction method, was used for Example 8.

The magnetic disk and the lubricant of this Example 8 were evaluated in the same manner as in Example 7. The results thereof are collectively shown in Table 2 given below. Excellent results were also obtained for this Example.

Comparative Examples 4 to 7

As a lubricant, use was made of a conventional perfluoropolyether-based lubricant, Fomblin Z-DOL 2000 (trade name) manufactured by Solvay Solexis, Inc., having been subjected to molecular weight fractionation by the GPC method to have Mn of 1960 and a molecular weight dispersion of 1.08. Then, a solution in which this lubricant was dispersed and dissolved in a fluorine-based solvent, Vertrel XF (trade name) manufactured by DuPont-Mitsui Fluorochemicals Co., Ltd., was used as a coating solution and a magnetic disk formed with layers up to a protective layer was immersed therein and coated therewith by the dipping method, thereby forming a lubricating layer. Herein, the concentration of the coating solution was properly adjusted so that the lubricating layer was formed to a thickness in the range of 5 to 10 Å. A magnetic disk manufactured in the same manner as in Example 7 except the above was used for Comparative Example 4.

Further, a magnetic disk manufactured in the same manner except that use was made, as a lubricant, of a conventional perfluoropolyether-based lubricant, Fomblin Z-DOL 4000 (trade name) manufactured by Solvay Solexis, Inc., having been subjected to molecular weight fractionation by the GPC method to have Mn of 4120 and a molecular weight dispersion of 1.08, was used for Comparative Example 5. Comparative lubricants having different Mn were prepared by the molecular weight fractionation and the relationship between Mn and EW thereof was plotted (black triangle marks) in FIG. 2 described above. All the compounds were deviated from the predetermined range (the range surrounded by segments a to d in FIG. 2) representing the relationship between Mn and EW defined by this invention.

Further, a magnetic disk manufactured in the same manner except that use was made, as a lubricant, of a conventional perfluoropolyether-based lubricant, Fomblin Z-Tetraol 2000 (trade name) manufactured by Solvay Solexis, Inc., having been subjected to molecular weight fractionation by the GPC method to have Mn of 2390 and a molecular weight dispersion of 1.08, was used for Comparative Example 6.

Further, when producing the lubricant compound of this invention used in the above Example 7, a compound was produced as a lubricant by trimerization of perfluoropolyether through a linking group by changing the synthesizing conditions thereof. A magnetic disk manufactured in the same manner except that use was made of this produced trimer compound having been subjected to molecular weight fractionation by the GPC method to have Mn of 6430, was used for Comparative Example 7.

The magnetic disks and the lubricants of Comparative Examples 4 to 7 described above were evaluated in the same manner as in Example 7. The results thereof are collectively shown in Table 2 given below.

TABLE 2

| | Molecular Weight Mn | EW | Viscosity (−10° C.) mPa·S | Bonded Ratio | Lubricant Coverage | LUL Durability | Fly Stiction Pass Rate | Pin-On Test | Lubricant (Bulk) Heat Resistance | Alumina Resistance |
|---|---|---|---|---|---|---|---|---|---|---|
| Example 7 | 4340 | 903 | 8860 | 85% | 97% | endurred 900,000 times | 100% | 700 | 4% | 6% |
| Example 8 | 3950 | 1002 | 7400 | 80% | 95% | endured 800,000 times | 100% | 680 | 7% | 10% |
| Comparative Example 4 | 1960 | 1020 | 854 | 65% | 90% | failed at 400,000 times | 70% | 150 | 68% | 80% |
| Comparative Example 5 | 4120 | 2150 | 886 | 67% | 90% | failed at 200,000 times | 70% | 200 | 24% | 82% |
| Comparative Example 6 | 2390 | 628 | 67000 | 78% | 93% | endured 700,000 times | 100% | 380 | 22% | 15% |
| Comparative Example 7 | 6430 | 816 | 75000 | 90% | 97% | endured 700,000 times | 80% | 750 | 1% | 3% |

With the magnetic disks of Comparative Examples 4 to 6 each using the conventional lubricant, the evaluation results were low for almost all the evaluation items such as, particularly, the bonding performance to the carbon-based protective layer, the LUL durability, the fly stiction test, the pin-on test, the lubricant (bulk) heat resistance, and the alumina resistance. Further, with the magnetic disk of Comparative Example 7 using the perfluoropolyether trimer compound, the molecular weight and the viscosity were both high and the evaluation results were bad particularly for the LUL durability and the fly stiction test. Thus, the reliability is low as compared with the magnetic disks of the Examples.

The invention claimed is:

1. A lubricant for a magnetic disk, said lubricant containing a perfluoropolyether-based compound in which perfluoropolyether groups are bonded to each other through a divalent linking group having at least one hydroxyl group such that the perfluoropolyether-based compound has at least one hydroxyl group around a center of a molecular chain, the perfluoropolyether-based compound having a number-average molecular weight in the range of 1000 to 6000 and a normalized value of the number of hydroxyl groups contained in a molecule in the range of 180 to 1600.

2. A lubricant for a magnetic disk according to claim 1, wherein the number of hydroxyl groups around the center of the molecular chain is two or more.

3. A lubricant for a magnetic disk according to claim 1, wherein the number of hydroxyl groups around the center of the molecular chain is three or more.

4. A lubricant for a magnetic disk according to claim 1, wherein a viscosity of said lubricant at −10° C. is in the range of 5000 to 12000 mPa·s.

5. A lubricant for a magnetic disk according to claim 4, wherein an amount of change in viscosity relative to a change in temperature is in the range of −0.03 to −0.08 mPa·s/° C.

6. A magnetic disk having a magnetic layer, a protective layer, and a lubricating layer over a substrate, said magnetic disk wherein said lubricating layer contains a lubricant for a magnetic disk according to claim 1.

7. A magnetic disk according to claim 6, wherein said protective layer includes a carbon-based protective layer.

8. A magnetic disk according to claim 7, said magnetic disk being adapted to be mounted in a magnetic disk apparatus of a load unload system.

* * * * *